(12) United States Patent
Porat et al.

(10) Patent No.: US 8,774,124 B2
(45) Date of Patent: Jul. 8, 2014

(54) DEVICE COEXISTENCE WITHIN SINGLE USER, MULTIPLE USER, MULTIPLE ACCESS, AND/OR MIMO WIRELESS COMMUNICATIONS

(75) Inventors: Ron Porat, San Diego, CA (US); Nihar Jindal, San Mateo, CA (US); Matthew James Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 103 days.

(21) Appl. No.: 13/454,033

(22) Filed: Apr. 23, 2012

(65) Prior Publication Data

US 2012/0269069 A1    Oct. 25, 2012

Related U.S. Application Data

(60) Provisional application No. 61/478,537, filed on Apr. 24, 2011, provisional application No. 61/493,577, filed on Jun. 6, 2011, provisional application No. 61/496,153, filed on Jun. 13, 2011, provisional application No. 61/501,239, filed on Jun. 26, 2011, provisional application No. 61/507,955, filed on Jul. 14, 2011, provisional application No. 61/512,363, filed on Jul. 27, 2011, provisional application No. 61/522,608, filed on Aug. 11, 2011, provisional application No. 61/542,602, filed on Oct. 3, 2011, provisional application No. 61/561,722, filed on Nov. 18, 2011, provisional application No. 61/577,597, filed on Dec. 19, 2011, provisional application No. 61/584,142, filed on Jan. 6, 2012, provisional application No. 61/592,514, filed on Jan. 30, 2012, provisional application No. 61/595,616, filed on Feb. 6, 2012, provisional application No. 61/598,293, filed on Feb. 13, 2012, provisional application No. 61/602,504, filed on Feb. 23, 2012.

(51) Int. Cl.
*H04W 4/00* (2009.01)

(52) U.S. Cl.
USPC ........... 370/330; 370/228; 370/229; 370/437; 370/468

(58) Field of Classification Search
None
See application file for complete search history.

(56) References Cited

U.S. PATENT DOCUMENTS

| | | | |
|---|---|---|---|
| 8,121,144 B2 * | 2/2012 | Bitran | 370/459 |
| 8,204,036 B2 * | 6/2012 | Russell et al. | 370/350 |
| 2002/0061031 A1 * | 5/2002 | Sugar et al. | 370/466 |
| 2004/0028003 A1 * | 2/2004 | Diener et al. | 370/319 |
| 2004/0048577 A1 * | 3/2004 | Godfrey et al. | 455/67.11 |
| 2004/0116075 A1 * | 6/2004 | Shoemake et al. | 455/41.2 |
| 2005/0135284 A1 * | 6/2005 | Nanda et al. | 370/294 |
| 2005/0180369 A1 * | 8/2005 | Hansen et al. | 370/338 |
| 2011/0009060 A1 * | 1/2011 | Hsu et al. | 455/41.2 |

* cited by examiner

*Primary Examiner* — Donald Mills
(74) *Attorney, Agent, or Firm* — Garlick & Markison; Shayne X. Short

(57) ABSTRACT

Device coexistence within single user, multiple user, multiple access, and/or MIMO wireless communications. Different respective communication devices operating using different respective communication channels having different respective channel bandwidths may be implemented within a given communication system. For example, different respective communication devices may belong to different basic services sets (BSSs) (e.g., a 1 MHz BSS operating using channel bandwidths of 1 MHz, and a 2 MHz BSS operating using channel bandwidths of 2 MHz). To effectuate coexistence among different respective devices operating using different respective channel bandwidths, devices but longing to the 1 MHz BSS monitor for and listen for 2 MHz wide communication activity, and those 1 MHz BSS communication devices defer to any detected communication activity on any portion of the 2 MHz channel.

20 Claims, 25 Drawing Sheets

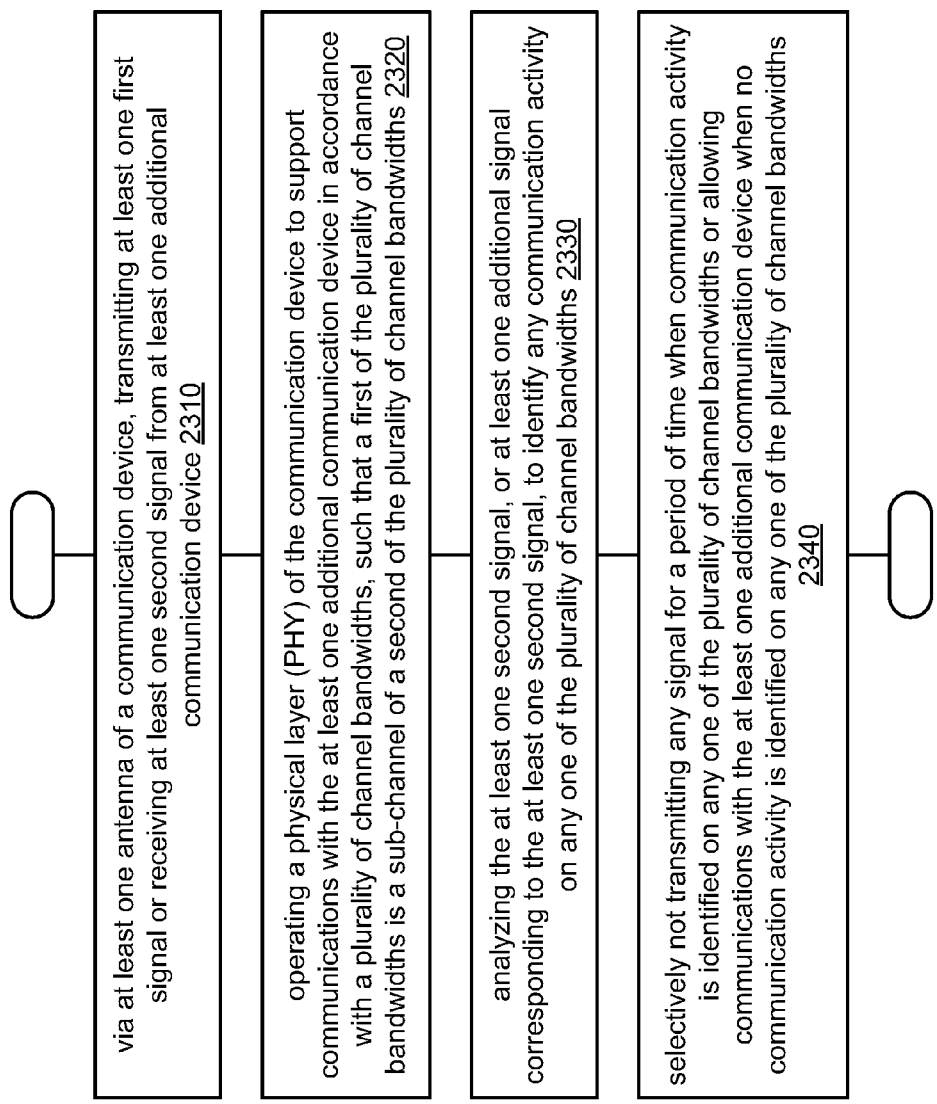

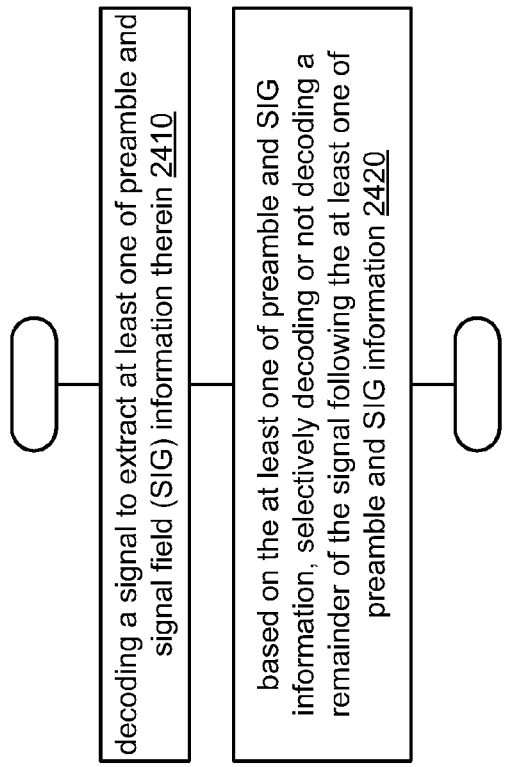

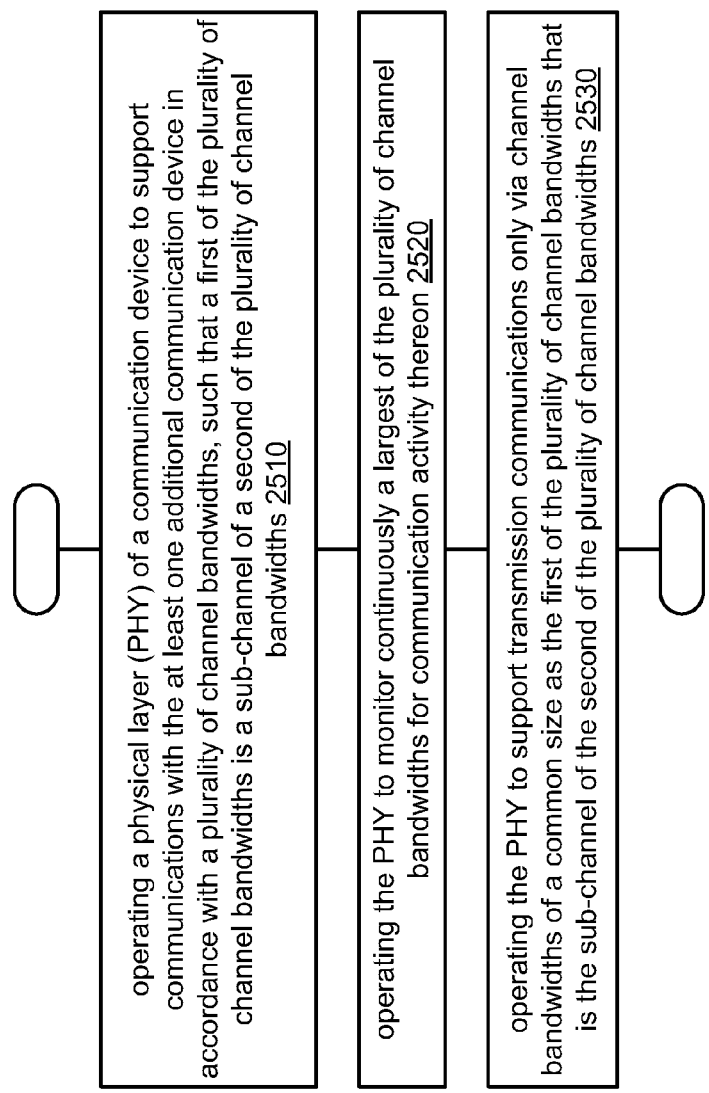

DEVICE COEXISTENCE WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Applications which are hereby incorporated herein by reference in their entirety and made part of the present U.S. Utility patent application for all purposes:

1. U.S. Provisional Patent Application Ser. No. 61/478,537, entitled "Preamble for use within multiple user, multiple access, and/or MIMO wireless communications," filed Apr. 24, 2011, pending.

2. U.S. Provisional Patent Application Ser. No. 61/493,577, entitled "Preamble for use within multiple user, multiple access, and/or MIMO wireless communications," filed Jun. 6, 2011, pending.

3. U.S. Provisional Patent Application Ser. No. 61/496,153, entitled "Preamble for use within multiple user, multiple access, and/or MIMO wireless communications," filed Jun. 13, 2011, pending.

4. U.S. Provisional Patent Application Ser. No. 61/501,239, entitled "Preamble for use within multiple user, multiple access, and/or MIMO wireless communications," filed Jun. 26, 2011, pending.

5. U.S. Provisional Patent Application Ser. No. 61/507,955, entitled "Preamble for use within multiple user, multiple access, and/or MIMO wireless communications," filed Jul. 14, 2011, pending.

6. U.S. Provisional Patent Application Ser. No. 61/512,363, entitled "Preamble for use within multiple user, multiple access, and/or MIMO wireless communications," filed Jul. 27, 2011, pending.

7. U.S. Provisional Patent Application Ser. No. 61/522,608, entitled "Preamble for use within multiple user, multiple access, and/or MIMO wireless communications," filed Aug. 11, 2011, pending.

8. U.S. Provisional Patent Application Ser. No. 61/542,602, entitled "Preamble for use within single user, multiple user, multiple access, and/or MIMO wireless communications," filed Oct. 3, 2011, pending.

9. U.S. Provisional Patent Application Ser. No. 61/561,722, entitled "Preamble for use within single user, multiple user, multiple access, and/or MIMO wireless communications," filed Nov. 18, 2011, pending.

10. U.S. Provisional Patent Application Ser. No. 61/577,597, entitled "Preamble for use within single user, multiple user, multiple access, and/or MIMO wireless communications," filed Dec. 19, 2011, pending.

11. U.S. Provisional Patent Application Ser. No. 61/584,142, entitled "Preamble for use within single user, multiple user, multiple access, and/or MIMO wireless communications," filed Jan. 6, 2012, pending.

12. U.S. Provisional Patent Application Ser. No. 61/592,514, entitled "Preamble for use within single user, multiple user, multiple access, and/or MIMO wireless communications," filed Jan. 30, 2012, pending.

13. U.S. Provisional Patent Application Ser. No. 61/595,616, entitled "Preamble for use within single user, multiple user, multiple access, and/or MIMO wireless communications," filed Feb. 6, 2012, pending.

14. U.S. Provisional Patent Application Ser. No. 61/598,293, entitled "Preamble for use within single user, multiple user, multiple access, and/or MIMO wireless communications," filed Feb. 13, 2012, pending.

15. U.S. Provisional Patent Application Ser. No. 61/602,504, entitled "Preamble for use within single user, multiple user, multiple access, and/or MIMO wireless communications," filed Feb. 23, 2012, pending.

INCORPORATION BY REFERENCE

The following U.S. Utility patent applications are hereby incorporated herein by reference in their entirety and made part of the present U.S. Utility patent application for all purposes:

1. U.S. Utility patent application Ser. No. 13/453,703, entitled "Preamble for use within single user, multiple user, multiple access, and/or MIMO wireless communications," filed concurrently on Apr. 23, 2012, pending.

2. U.S. Utility patent application Ser. No. 13/453,998, entitled "Doppler adaptation using pilot patterns within single user, multiple user, multiple access, and/or MIMO wireless communications," filed concurrently on Apr. 23, 2012, pending.

3. U.S. Utility patent application Ser. No. 13/454,010, entitled "Long training field (LTF) for use within single user, multiple user, multiple access, and/or MIMO wireless communications," filed concurrently on Apr. 23, 2012, pending.

4. U.S. Utility patent application Ser. No. 13/454,021, entitled "Short training field (STF) for use within single user, multiple user, multiple access, and/or MIMO wireless communications," filed concurrently on Apr. 23, 2012, pending.

INCORPORATION BY REFERENCE

The following IEEE standards/draft IEEE standards are hereby incorporated herein by reference in their entirety and are made part of the present U.S. Utility patent application for all purposes:

1. IEEE Std 802.11™—2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11™—2012, (Revision of IEEE Std 802.11-2007), 2793 total pages (incl. pp. i-xcvi, 1-2695).

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11™—2008, IEEE Std 802.11y™—2008, and IEEE Std 802.11r™—2009), 536 total pages (incl. pp. i-xxxii, 1-502).

3. IEEE Draft P802.11-REVmb™/D12, November 2011 (Revision of IEEE Std 802.11™—2007 as amended by IEEE Std 802.11k™—2008, IEEE Std 802.11r™—2008, IEEE Std 802.11y™—2008, IEEE Std 802.11w™—2009, IEEE Std 802.11n™—2009, IEEE Std 802.11p™—2010, IEEE Std 802.11z™—2010, IEEE Std 802.11v™—2011, IEEE Std 802.11u™—2011, and IEEE Std 802.11s™—2011), "IEEE Standard for Information technology—Telecommunications and information exchange between systems—Local and metropolitan area networks—Specific requirements; Part 11: Wireless LAN Medium Access Control (MAC) and Physical Layer (PHY) Specifications," Prepared by the 802.11 Working Group of the LAN/MAN Standards Committee of the IEEE Computer Society, 2910 total pages (incl. pp. i-cxxviii, 1-2782).

4. IEEE P802.11ac™/D2.1, March 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338).

5. IEEE P802.11ad™/D6.0, March 2012, (Draft Amendment based on IEEE P802.11REVmb D12.0), (Amendment to IEEE P802.11REVmb D12.0 as amended by IEEE 802.11ae D8.0 and IEEE 802.11aa D9.0), "IEEE P802.11ad™/D6.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 664 total pages.

6. IEEE Std 802.11ae™—2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™—2012, (Amendment to IEEE Std 802.11™—2012), 52 total pages (incl. pp. i-xii, 1-38).

7. IEEE P802.11af™/D1.06, March 2012, (Amendment to IEEE Std 802.11REVmb™/D12.0 as amended by IEEE Std 802.11ae™/D8.0, IEEE Std 802.11aa™/D9.0, IEEE Std 802.11ad™/D5.0, and IEEE Std 802.11ac™/D2.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 140 total pages (incl. pp. i-xxii, 1-118).

BACKGROUND OF THE INVENTION

1. Technical Field of the Invention

The invention relates generally to communication systems; and, more particularly, it relates to effectuating long range and low rate wireless communications within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIG. 23, FIG. 24, and FIG. 25 are diagrams illustrating embodiments of methods for operating one or more wireless communication devices.

DETAILED DESCRIPTION OF THE INVENTION

Figure 1:
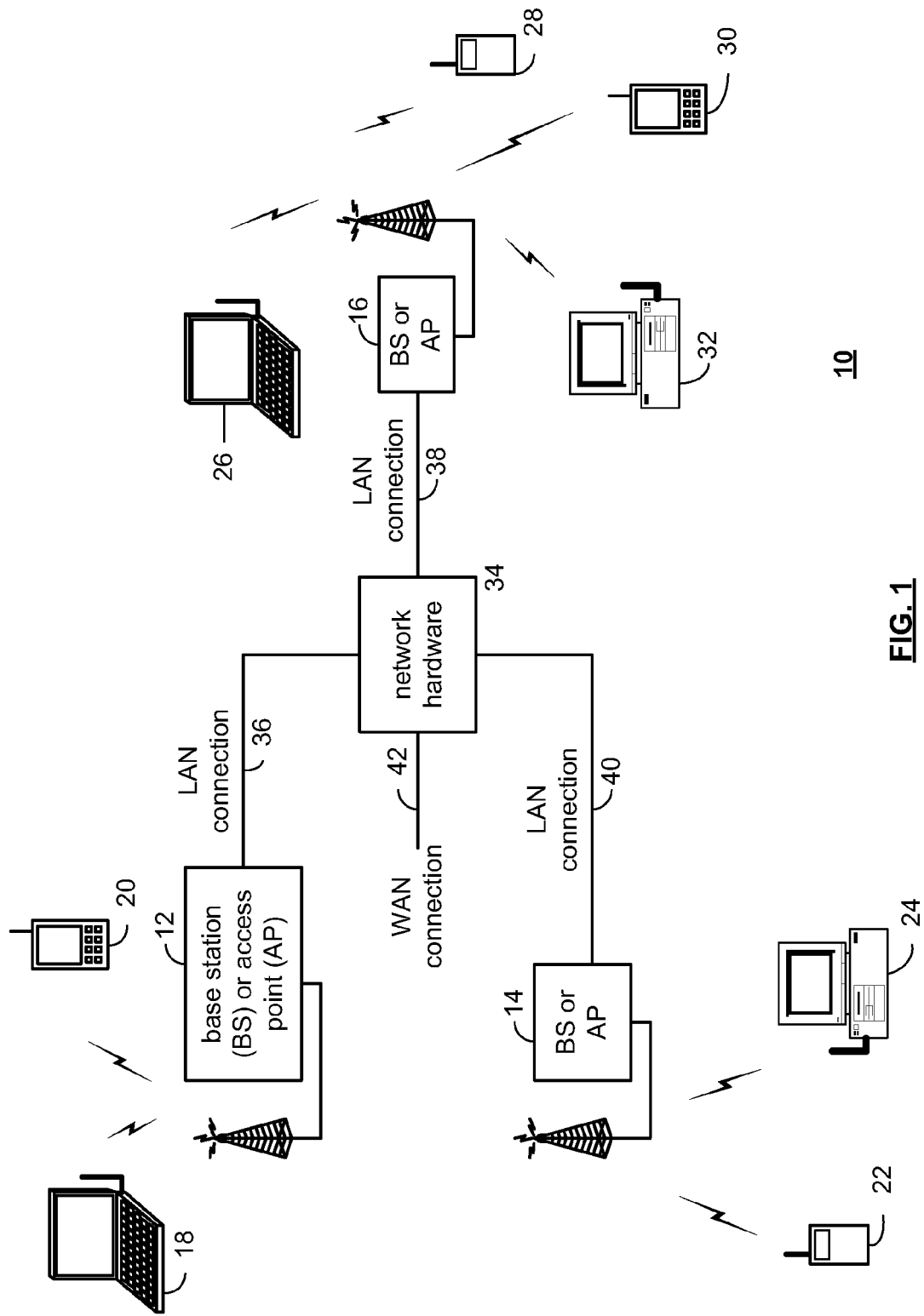
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
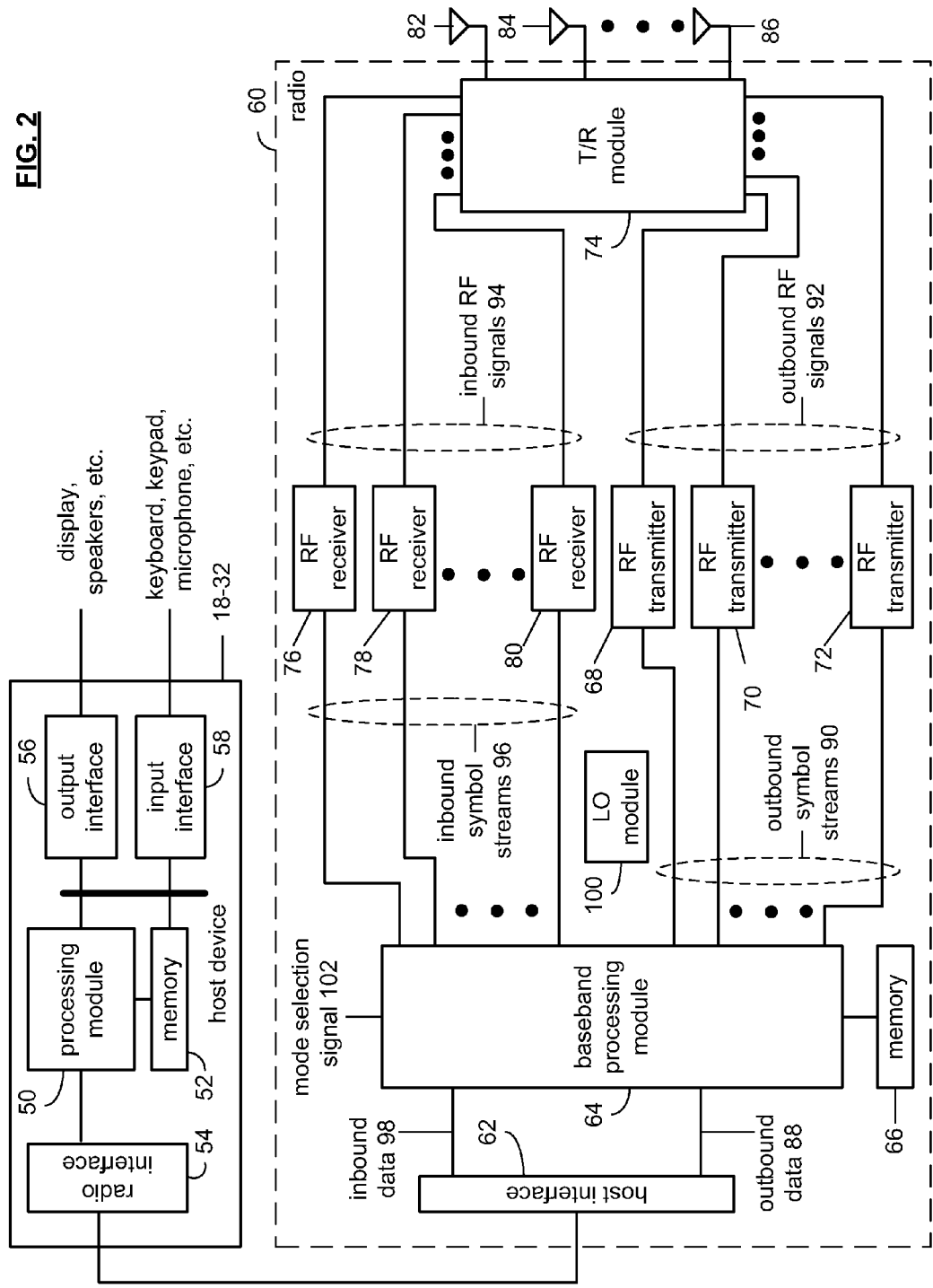
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per sub-carrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
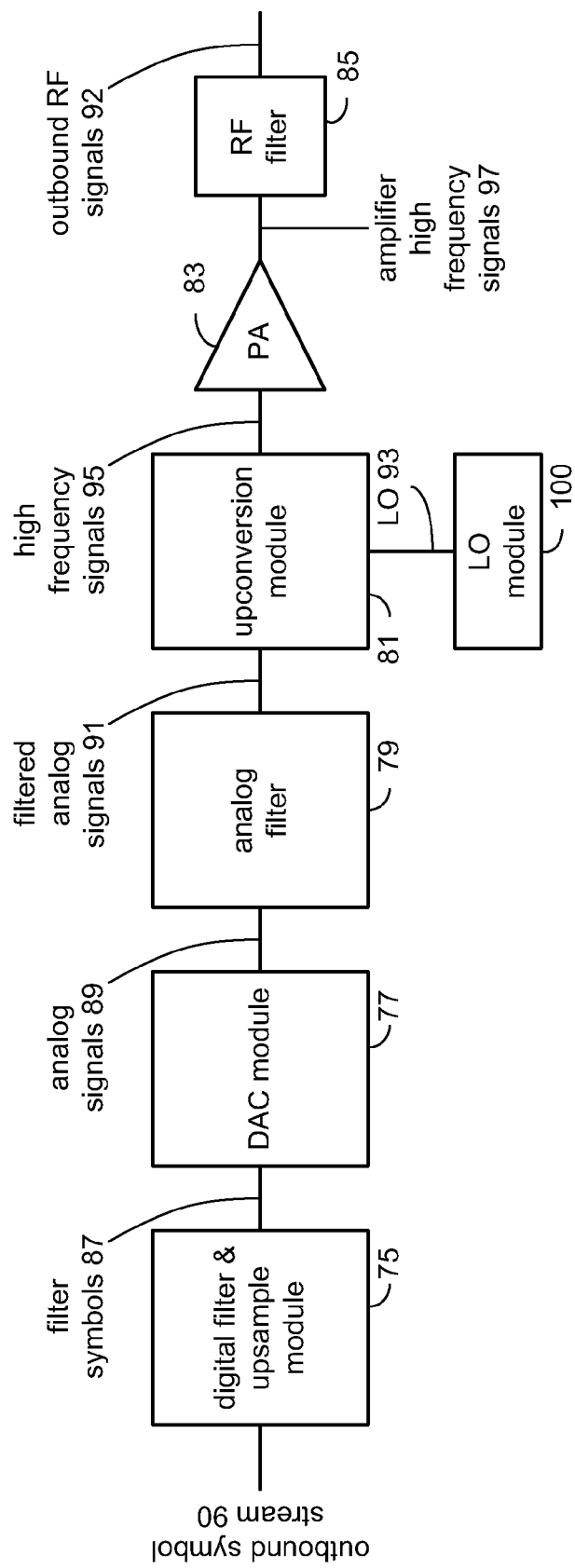
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
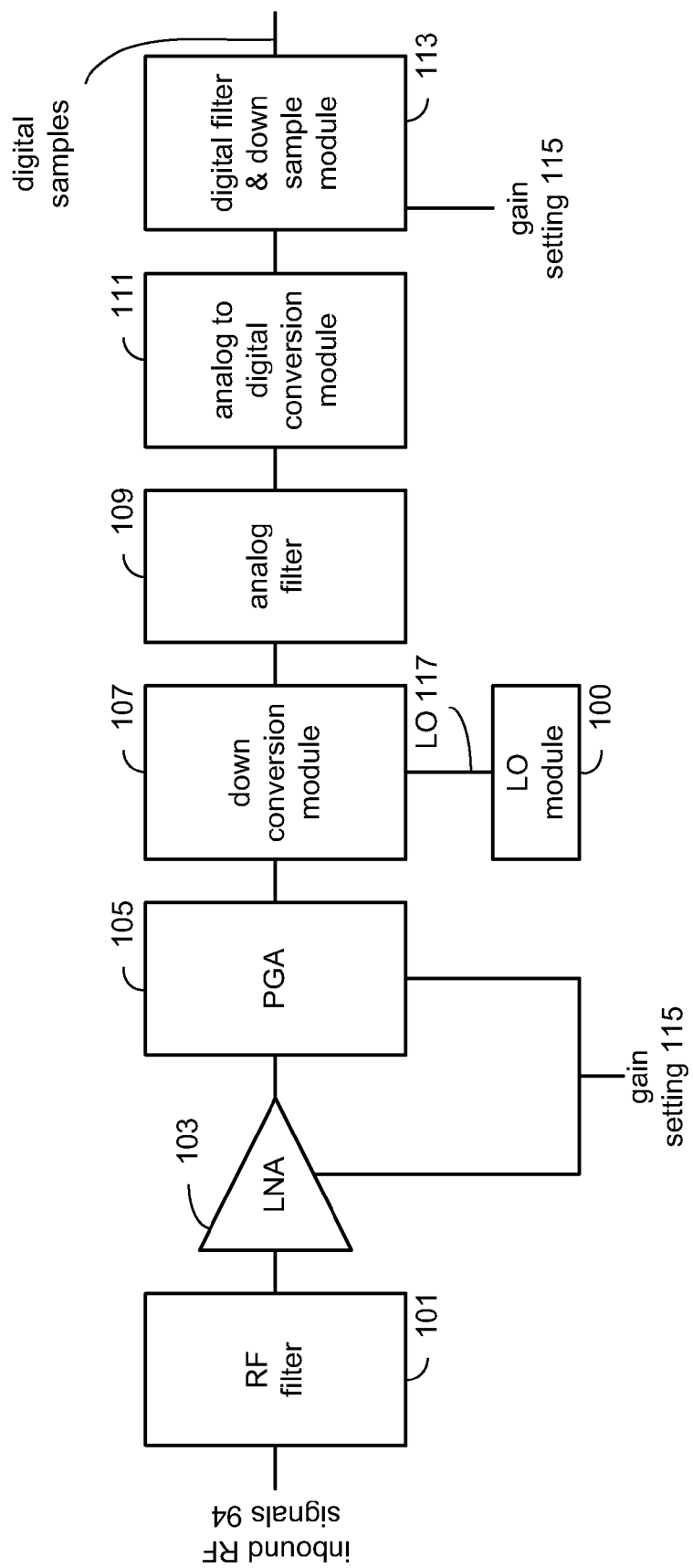
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency bandpass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
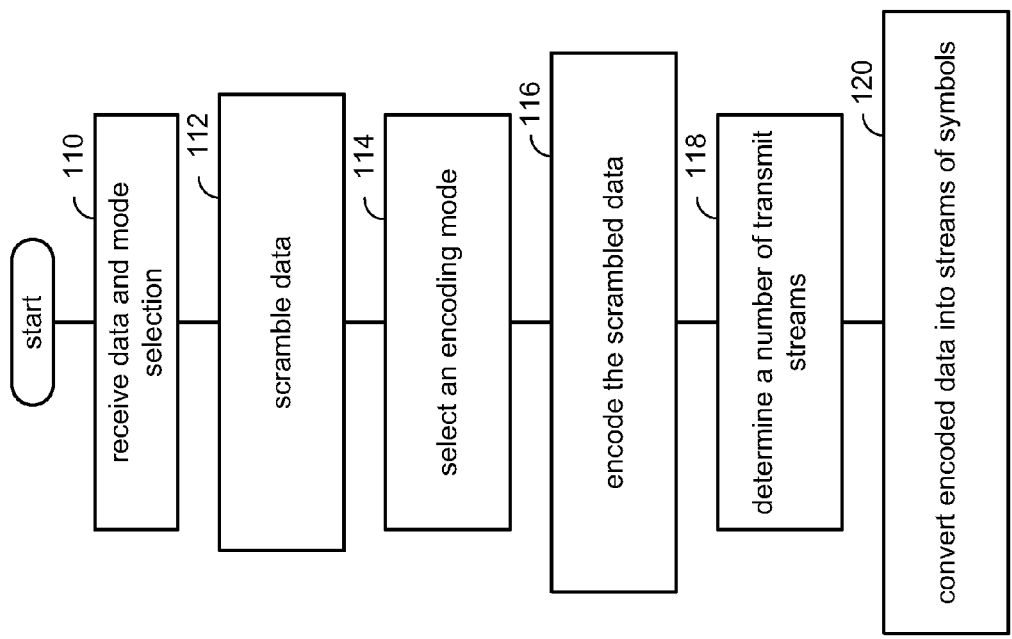
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
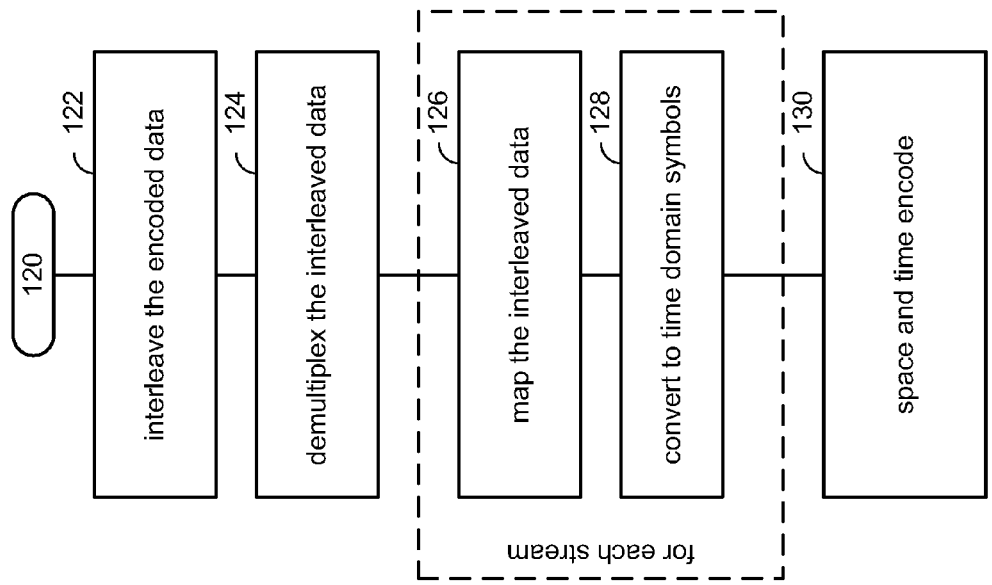
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and sub-carriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M In one embodiment the encoding matrix may comprise a form of:

$$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
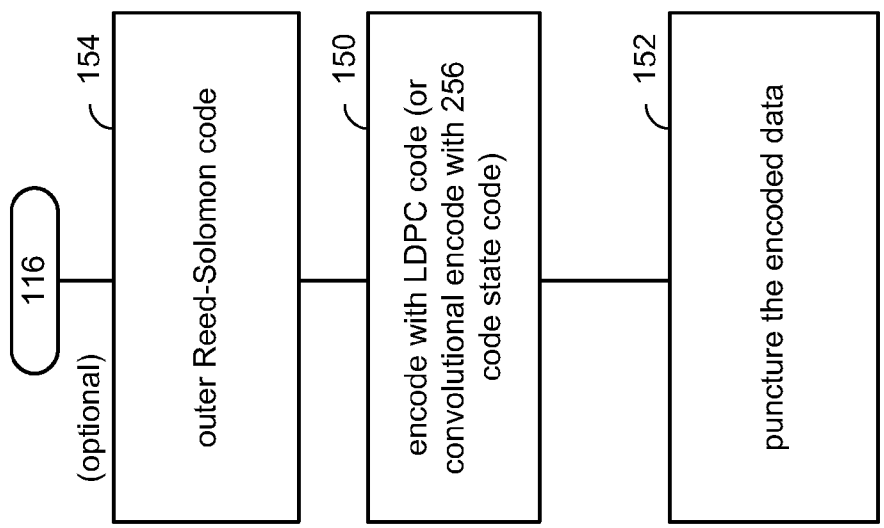
FIGS. 7-9 are diagrams illustrating various embodiments for encoding the scrambled data.
Figure 8:
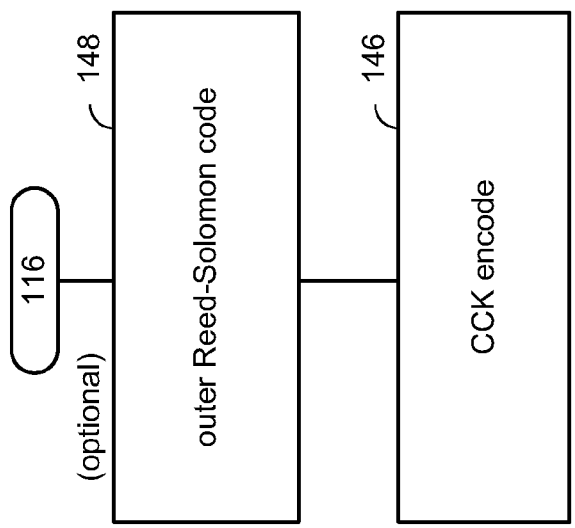
Figure 7:
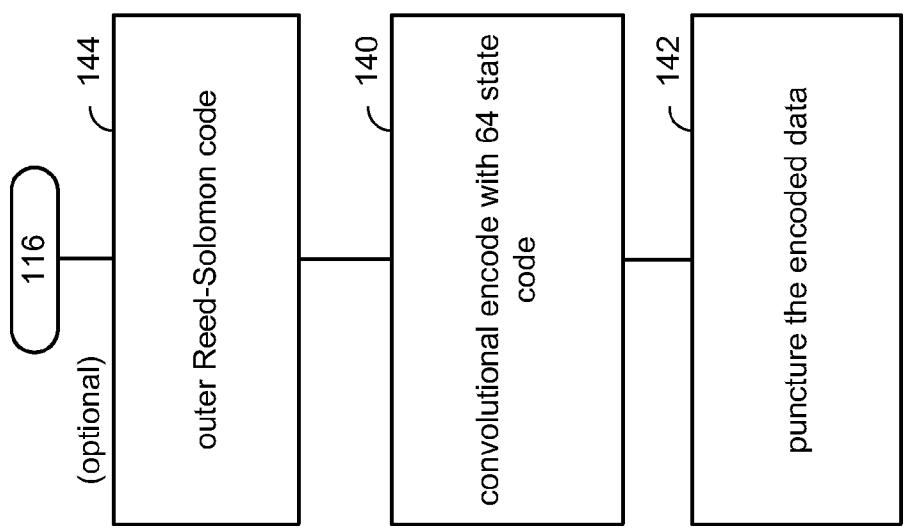

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
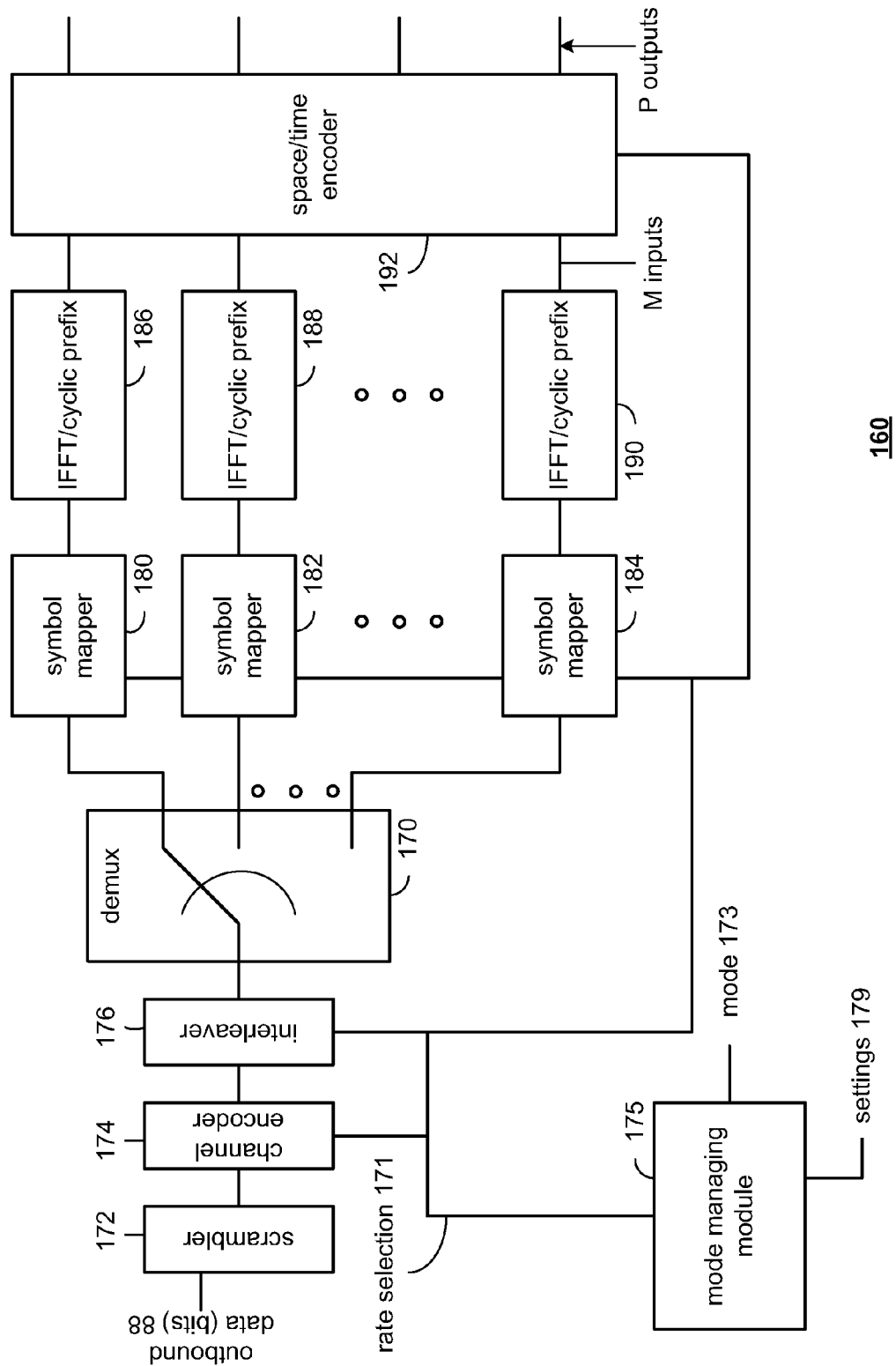
FIGS. 10A and 10B are diagrams illustrating embodiments of a radio transmitter.
Figure 10B:
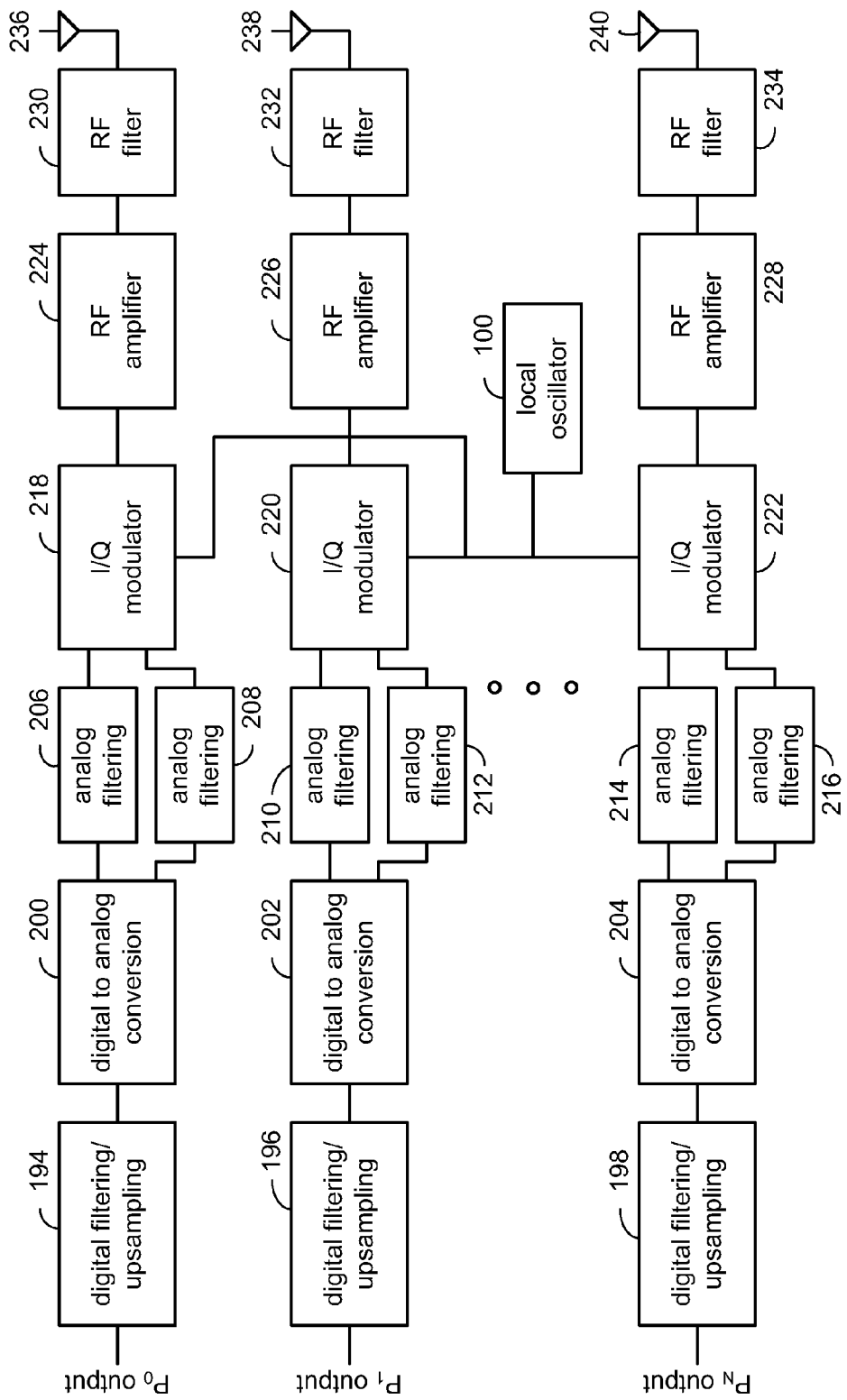

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, etc.) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
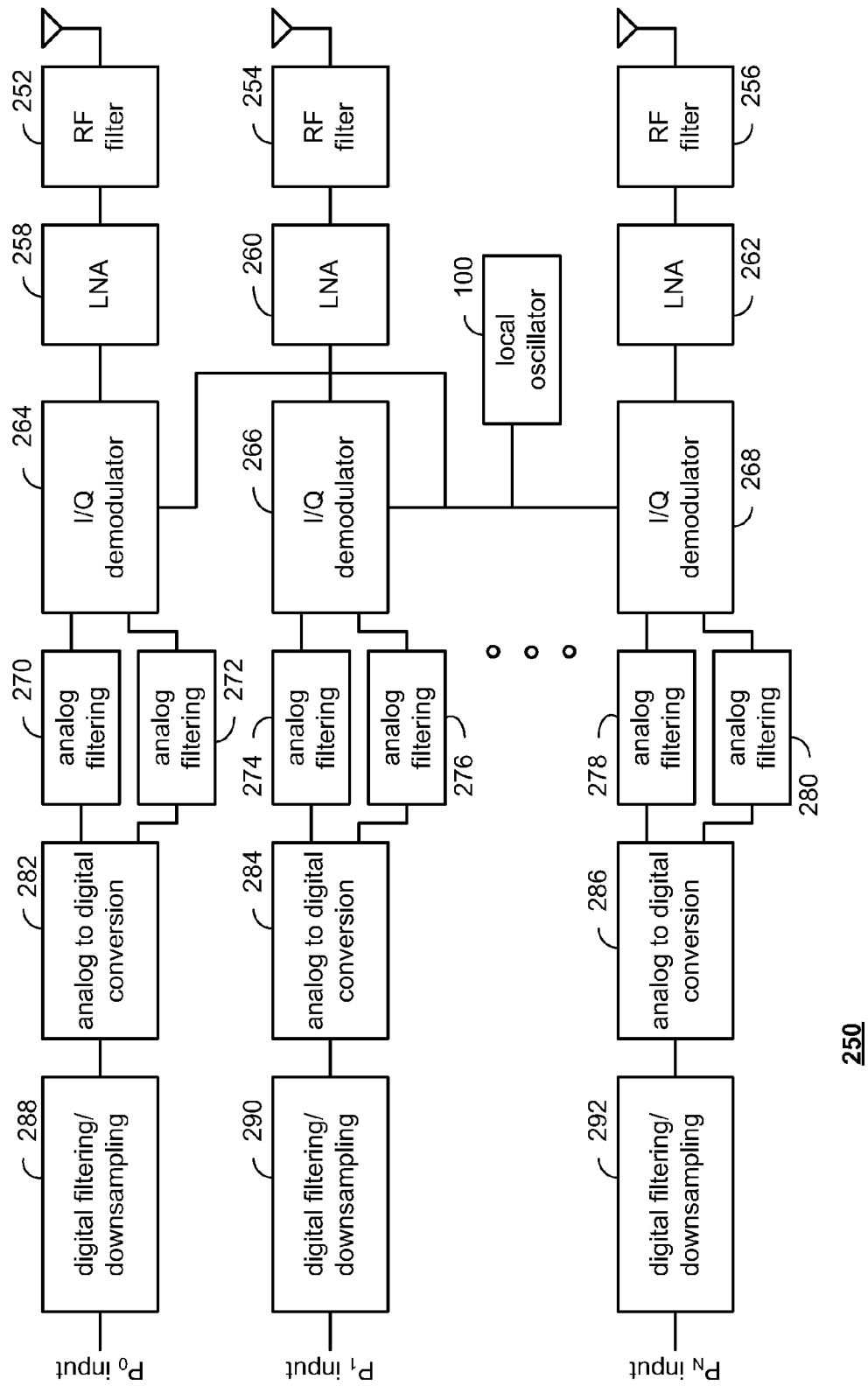
FIGS. 11A and 11B are diagrams illustrating embodiments of a radio receiver.
Figure 11B:
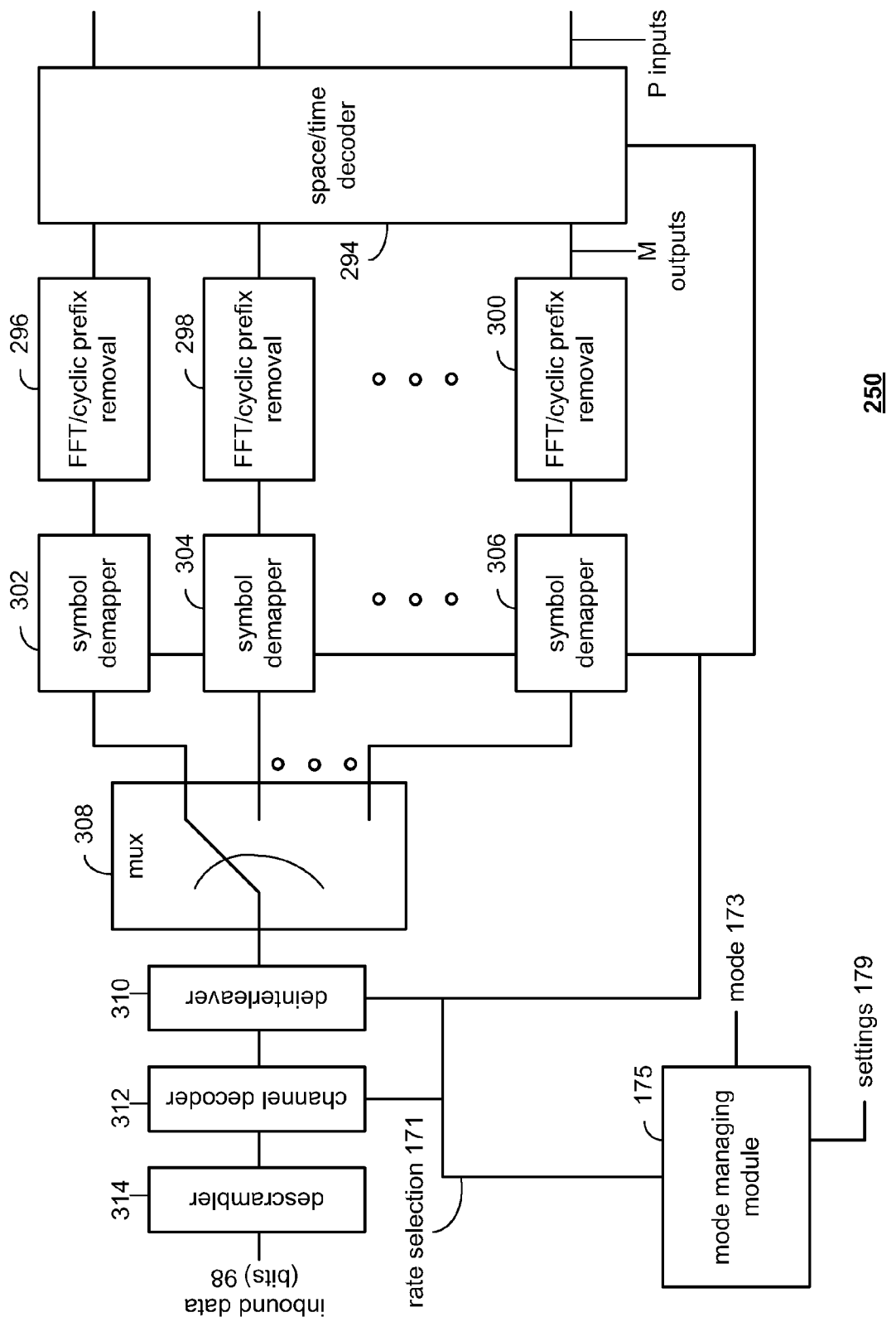

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
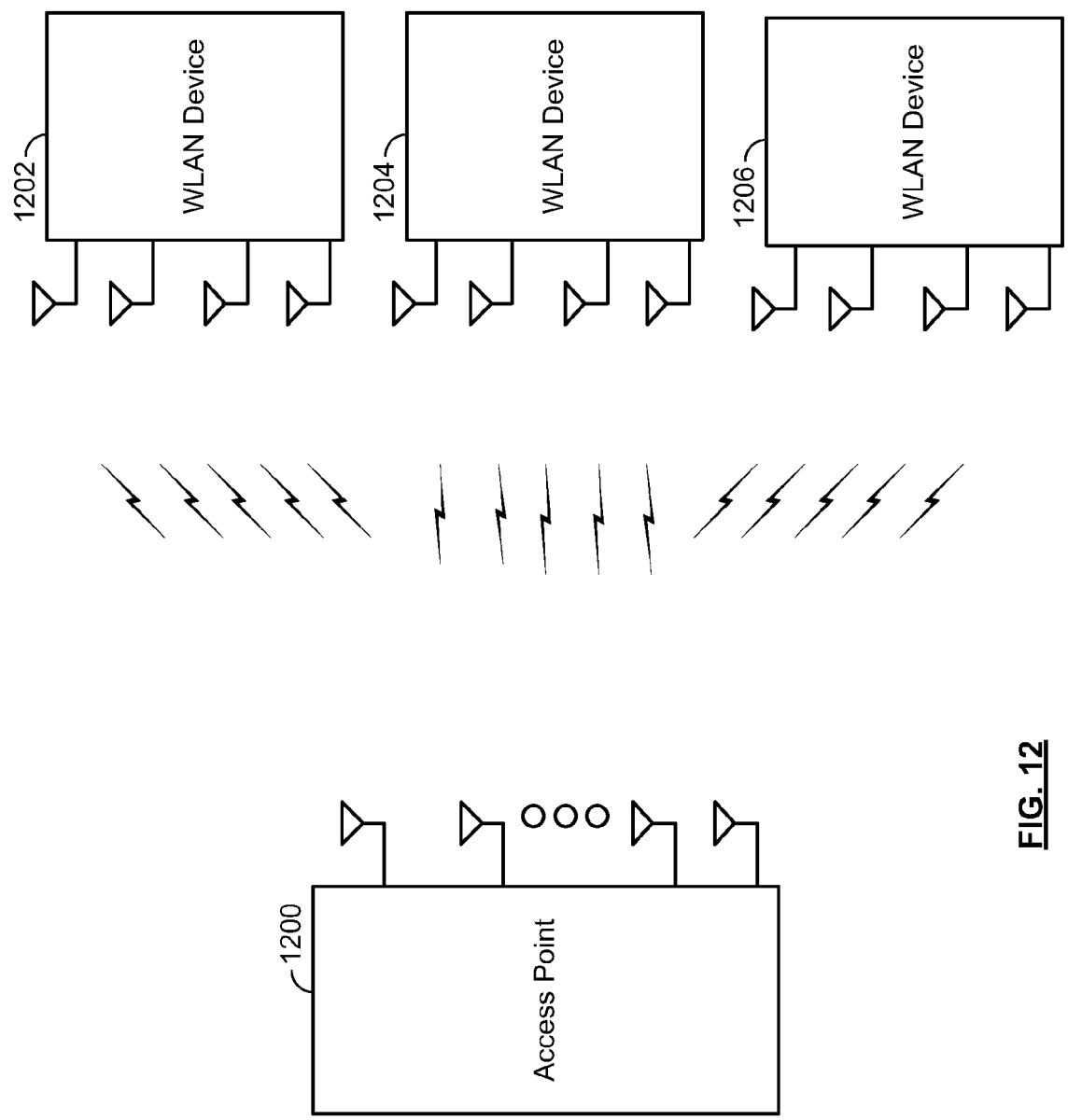
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 13:
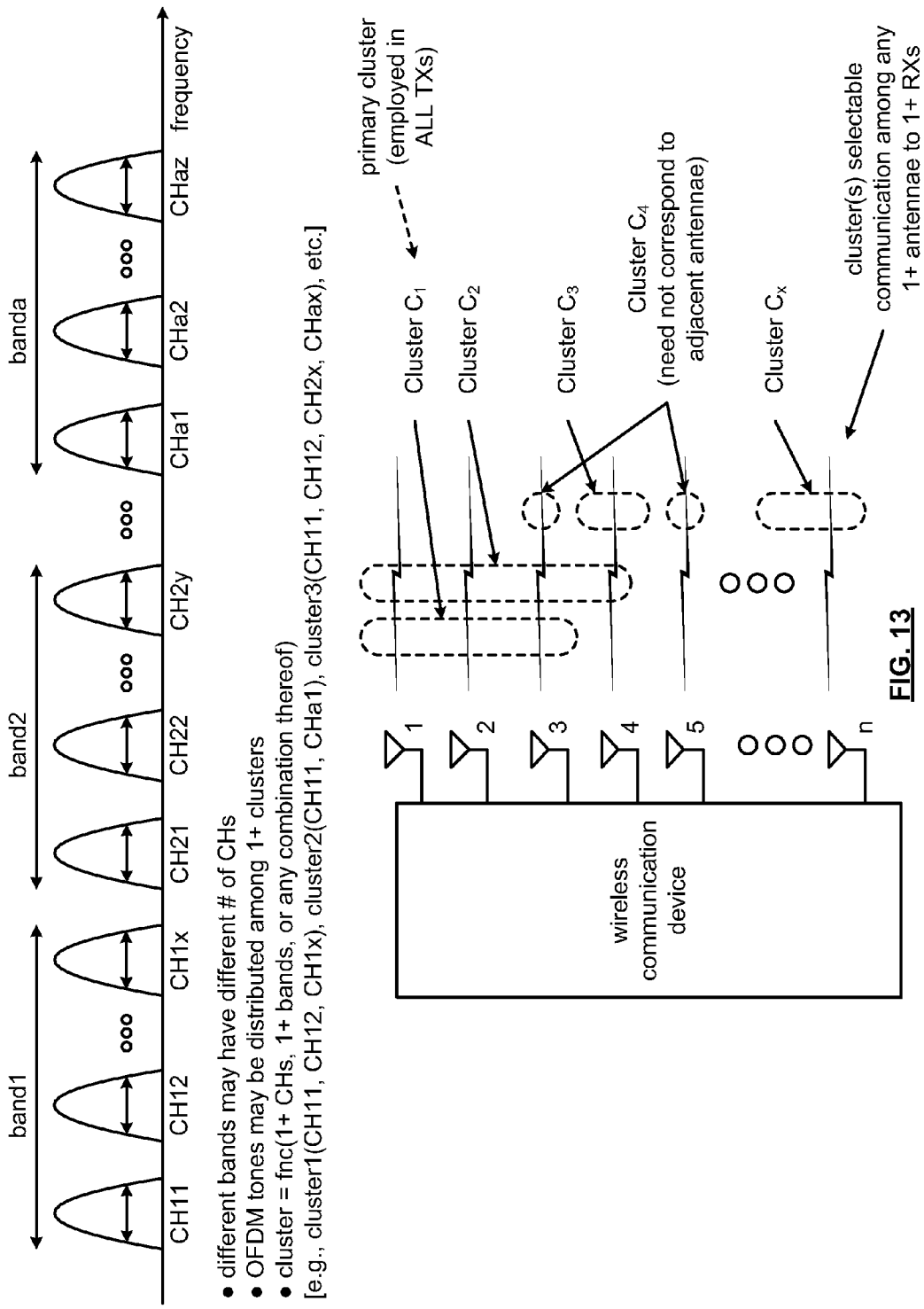
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Also, it is noted that, with respect to certain embodiments, general nomenclature may be employed wherein a transmitting wireless communication device (e.g., such as being an Access point (AP), or a wireless station (STA) operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ad, ae, af, ah, etc.).

For example, the IEEE 802.11ah is a new protocol/standard currently under development and is intended for long range and low rate applications operating in worldwide spectrum below 1 GHz. The available spectrum in each country differs and requires flexible design to accommodate different options. As such, modifications to the IEEE 802.11 standards, protocols, and/or recommended practices may be made to effectuate longer delay spread and lower data rate applications such as may be employed in accordance with the IEEE 802.11 ah developing standard.

Herein, from certain perspectives, certain adaptation and/or modification may be made with respect to IEEE 802.11ac standards, protocols, and/or recommended practices to provide efficient support for longer delay spread and lower data rate applications.

Figure 14:
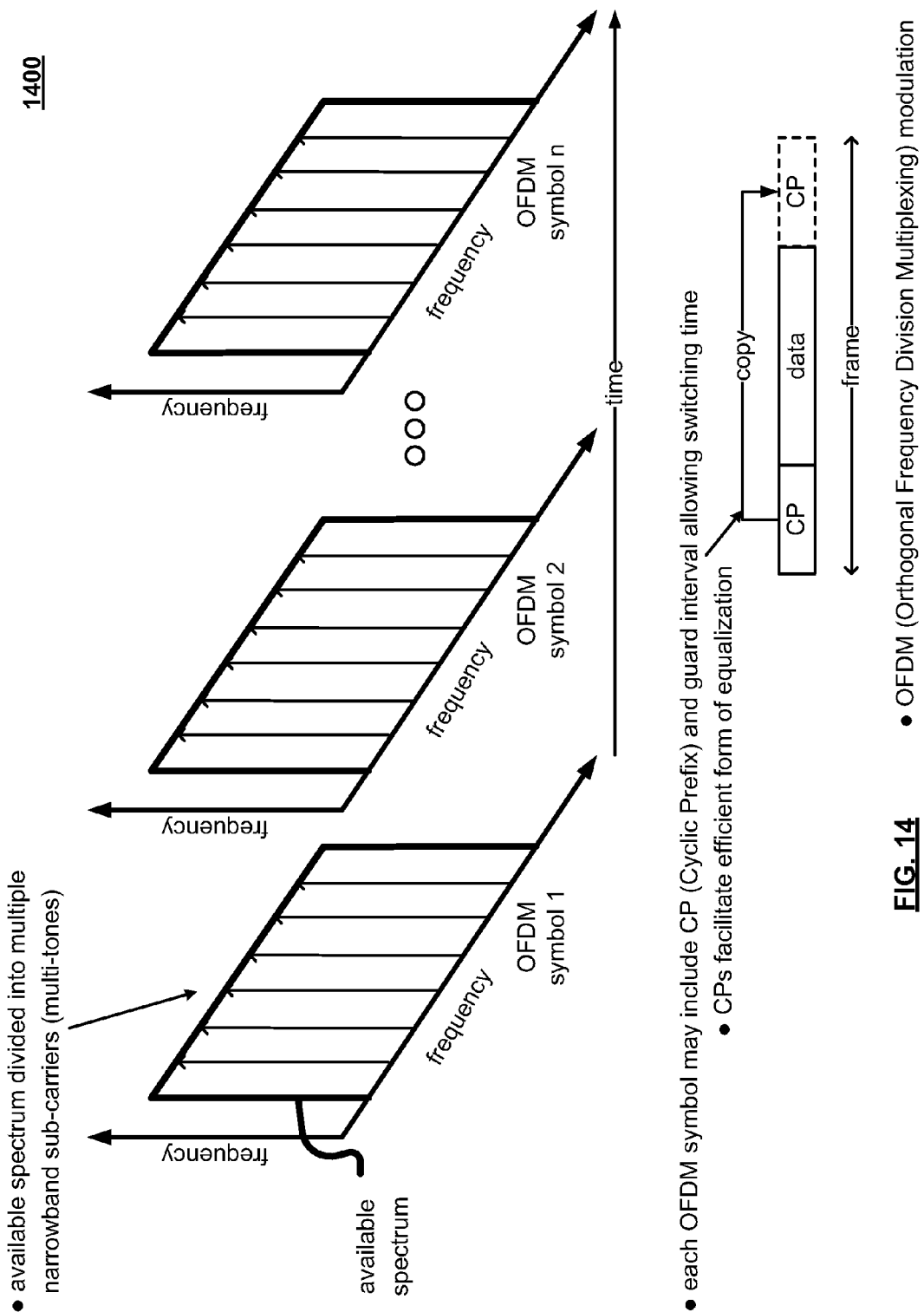
FIG. 14 illustrates an embodiment of OFDM (Orthogonal Frequency Division Multiplexing).

FIG. 14 illustrates an embodiment 1400 of OFDM (Orthogonal Frequency Division Multiplexing). OFDM modulation may be viewed a dividing up an available spectrum into a plurality of (narrowband) tones or sub-carriers (e.g., lower data rate tones or carriers). Typically, the frequency responses of these sub-carriers are overlapping and orthogonal. Each tone or sub-carrier may be modulated using any of a variety of modulation coding techniques.

OFDM modulation operates by performing simultaneous transmission of a larger number of (narrowband) tones or sub-carriers (or multi-tones). Oftentimes a guard interval (GI) or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols. Generally speaking, OFDM system design is based on the expected delay spread within the communication system (e.g., the expected delay spread of the communication channel).

Figure 15:
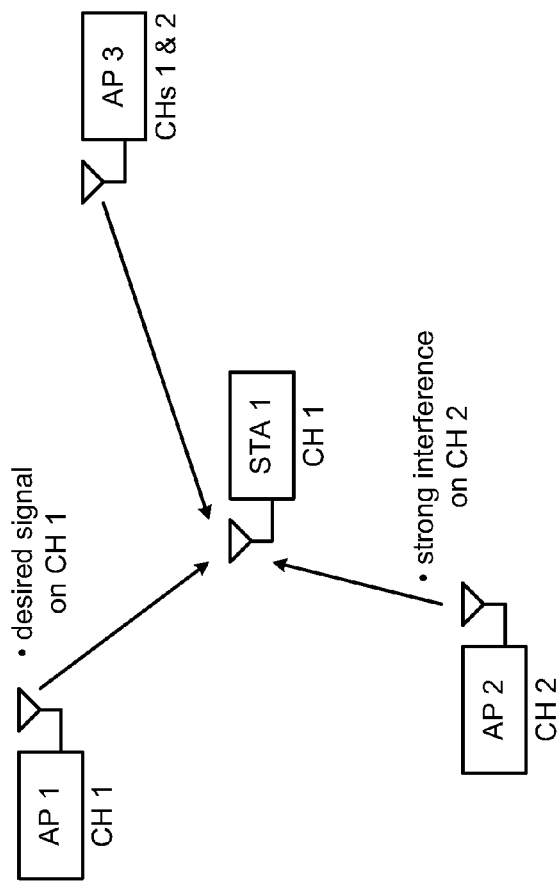
FIG. 15 illustrates an embodiment of different respective communication devices operating in a communication system or network.

FIG. 15 illustrates an embodiment 1500 of different respective communication devices operating in a communication system or network. As may be seen with respect to this diagram, and a different respective wireless communication devices (e.g., devices) and operate within a given area. For example, different respective devices may operate within a given communication network or system. For illustration with respect to this diagram as well as the other diagrams, a number of respective devices are depicted as being either access point (e.g., APs) and/or wireless station (STAs). Generally speaking, any of a number of different devices (e.g., APs, STAs, other wireless communication devices, etc.) may be implemented within a given communication to system and/or network.

The reader is referred to Option A described above and certain description related thereto such that certain interference issues may occur or exist particularly with respect to adjacent channels (e.g., adjacent 1 MHz channels such as in a 2 MHz bandwidth channel).

As can be seen in the diagram, three different respective APs operate using different combinations of channels and at least one STA is shown. The AP 1 operates using channel 1 (e.g., a 1 MHz BSS occupying channel 1 [0-1 MHz], referred to as BSS 1), the AP 1 operates using channel 2 (e.g., a 1 MHz BSS occupying channel 2 [1-2 MHz], referred to as BSS 2), and the AP 1 operates using channels 1 and 2 (e.g., a 2 MHz BSS occupying channels 1 and 2 [0-2 MHz]). The STA operates using channel 1 (e.g., a 1 MHz BSS occupying channel 1 [0-1 MHz]).

In accordance with such device operation, it can be seen that AP 1 and AP 2 simultaneously operate on their own respective 1 MHz channels (e.g., and consequently, each respective device includes a respective 1 MHz front end to effectuate processing of such communications). When AP 3 transmits a 2 MHz signal, any other devices in the BSS 1 and 2 defer their respective operation to allow the 2 MHz communication to go forth.

As may be seen with respect to the diagram, when the AP 2 operates using channel 2 (e.g., BSS 2), there may be relatively strong interference deleteriously affecting the communications between AP 1 and STA 1 (e.g., which are performed on the desired channel 1, e.g., BSS 1).

A number of different respective practices, implementations, and/or rules (e.g., options) are presented herein by which such communications may be made.

FIG. 16, FIG. 17, FIG. 18, and FIG. 19 illustrate various respective embodiments of different respective communication devices operating in a communication system or network in accordance with various practices, implementations, and/or rules.

With respect to various of these diagrams, it is again noted that a 32 FFT may be employed as the 1 MHz PHY signal bandwidth, and a 64 FFT may be employed as the 2 MHz PHY signal bandwidth. With respect to certain of these diagrams, reference is made therein with respect to the PHY signal bandwidth and not specifically the respective FFT size.

Figure 16:
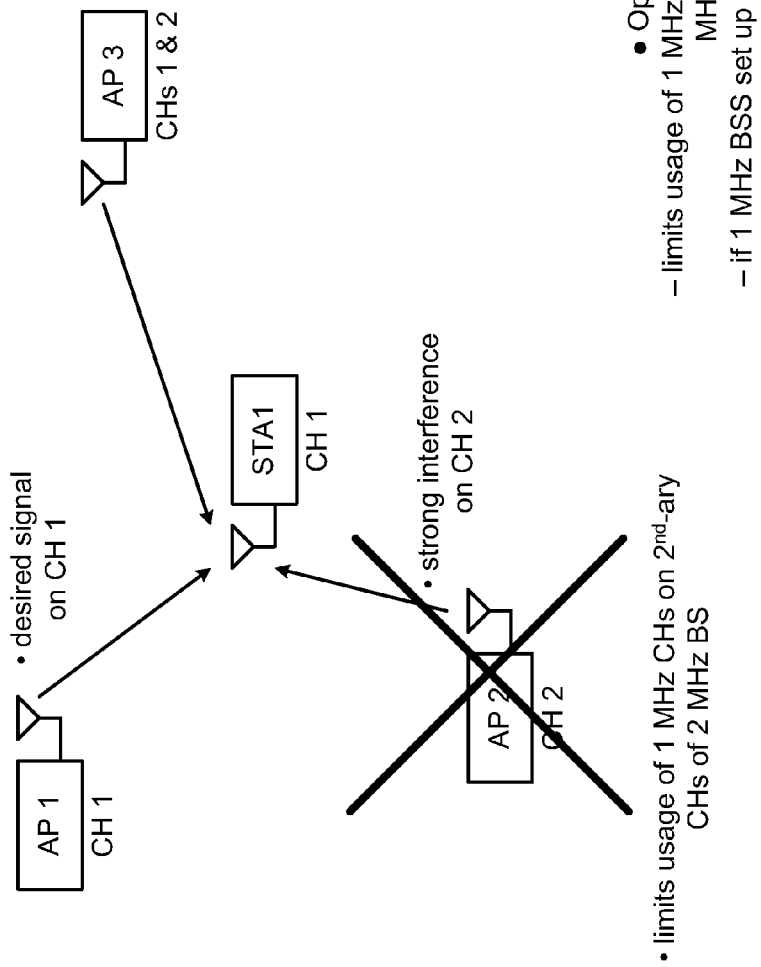
FIG. 16, FIG. 17, FIG. 18, and FIG. 19 illustrate various respective embodiments of different respective communication devices operating in a communication system or network in accordance with various practices, implementations, and/or rules.

Referring to the embodiment 1600 of FIG. 16 (e.g., Option 1), this option operates to limit or restrict the use of 1 MHz channels that fall on the secondary channels of a 2 MHz BSS. For example, with respect operations made using the channel 2 (e.g., a 1 MHz BSS occupying channel 2 [1-2 MHz], referred to as BSS 2), such communications are specifically prohibited or restricted. Generally speaking, only one of the 1 MHz bandwidth portions of a 2 MHz channel is allowed to be used at any given time (e.g., on the primary 1 MHz channel thereof).

Generally, no 1 MHz BSS channel shall be set up on a secondary channel of an active 2 MHz BSS. If a 1 MHz BSS is set up and is a 2 MHz wide transmission (e.g., or even a higher bandwidth) is detected, then the 1 MHz BSS should move to the 1 MHz channel being used (e.g., the primary channel) of the 2 MHz BSS or to another 1 MHz channel. As may be understood, certain implementation may desire not to have any restriction or limitation of 1 MHz channel usage. For example, there may be some other embodiments in which it may be desirable to limit or restrict the use of 1 MHz channels.

Relatively speaking, in regards to different respective options by which communication system or communication network operations may be made, this embodiment 1600 of FIG. 16 may relatively be viewed as being a more strict implementation. That is to say, communications will simply not be allowed on any secondary channel (e.g., such as a secondary channel being a 1 MHz portion of a 2 MHz channel) in an active bandwidth of an active BSS if there is already one active 1 MHz channel set up in operative. Generally speaking, with respect to 1 MHz communications, in accordance with this particular Option 1, there will never be two separate 1 MHz communications operative side-by-side with respect to one another in the frequency spectrum.

Figure 17:
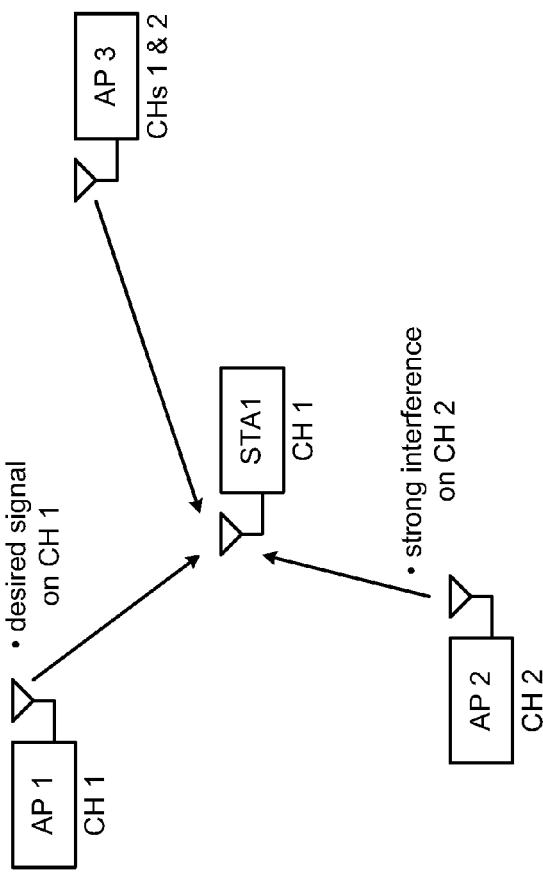

Referring to the embodiment 1700 of FIG. 17 (e.g., Option 2a), as may be understood with respect to this embodiment and as may be seen with respect to the diagram, all possible 1 MHz channels may in fact be used and set up for communications irrespective of any 2 MHz channels employed. For example, any respective 1 MHz channel may be used for communications even if a number of 2 MHz channels are operative or existent within the communication system or network.

As may be understood with respect to such operation, a 1 MHz transmission in either half of a 1 MHz channel may unfortunately cause deleterious effects such as reception problems for either a 2 MHz transmission or a 1 MHz transmission in the other half of the 2 MHz channel.

Also, as may be understood with respect to such operation, a given device operating in accordance with a 1 MHz BSS will need to listen to any possible 2 MHz wide transmissions even if that particular device belongs to a 1 MHz BSS. For example, even a wireless station belonging to the 1 MHz BSS will need to be capable of listening to communications occupying 2 MHz bandwidth. As may be understood with respect to such operation, even those respective devices that will mostly and typically operate in accordance with a 1 MHz BSS should include capability to listen to 2 MHz wide transmissions.

With respect to such an embodiment 1700 of FIG. 17 (e.g., Option 2a), in accordance with such operation, the respective preamble and SIG field(s) for any reception within the 2 MHz channel typically will undergo decoding. However, the PHY payload portion of a transmission for secondary receptions need not necessarily be decoded.

Correctly received SIG field length information is then counted down and used to indicate BUSY for the appropriate 1 MHz sub-channel. Those communication devices (e.g., STAs) defer to any detected activity on any portion of the 2 MHz channel for any transmission on any sub-channel within the 2 MHz.

It is also noted that a 1 MHz BSS may be viewed, from certain perspectives, as not being perfectly 1 MHz operative but rather a 2 MHz BSS self-imposing 1 MHz transmissions only on either the right or left channels. If, during the STF/LTF/SIG fields of an adjacent 1 MHz transmission, a 1 MHz transmission within the BSS occurs, it may be mis-detected (e.g., depending on power ratio and arrival time), such as over a relatively very small window.

In some alternative embodiments, a 1 MHz BSS operative device will trigger on adjacent 1 MHz traffic and may potentially be energy or power wasteful. However, in certain embodiments, it may be assumed that one megahertz BSS traffic is relatively low and will not impact the performance and/or power consumption to a significant degree. Also, it may be assumed that a 1 MHz BSS operative device will not decode the PHY payload associated with adjacent 1 MHz traffic.

With respect to such operation, a rule may be employed to aid in performance/power consumption. For example, if a 1 MHz transmission is detected on a secondary 1 MHz channel belonging to the same 2 MHz bandwidth portion, then a given device may proceed to decode the SIG field. Also, for the duration of that particular transmission, such as determined based upon the SIG field, that given device may selectively apply a primary 1 MHz bandpass filter to assist in better decoding of any transmission within its own BSS. A designer is provided wide latitude by which such filtering may be implemented, including employing digital and/or analog filter components and/or processing. Generally speaking, while a designer is given such wide design latitude, given the relatively low 1 MHz bandwidth, it may be desirable in certain embodiments to have an ADC with a relatively higher dynamic range to allow for better rejection of strong 1 MHz channels digitally. That is to say, there may be some instances or embodiments in which a higher dynamic range ADC in combination with relatively powerful digital filtering may be most suitable.

Also, with respect to certain embodiments, an assumption may be made that during 1 MHz transmission, no 2 MHz transmission will take place since the 2 MHz BSS will defer its respective operation to the 1 MHz transmission (e.g., whether that 1 MHz transmission be on a primary or secondary 1 MHz channel). That is to say, there may be some deference made by and with respect to 2 MHz transmissions in view of 1 MHz transmissions in some embodiments. However, even within such deferential operation between 2 MHz transmissions and 1 MHz transmissions, the respective 1 MHz transmissions need not necessarily defer respectively to adjacent 1 MHz activity. That is to say, each of the respective 1 MHz channels may be operated independently such that no deferential operation is made with respect to 1 MHz channels.

It is further noted that some devices within the communication system may not necessarily be able to filter dynamically a secondary only 1 MHz reception. That is to say, if certain devices do not have such capability to perform such a dynamic filtering, a capability bit may be used in communications associated with a given AP such that the AP may instruct certain of the respective other devices within the communication system not to start any communication or transmission if a transmission in an adjacent 1 MHz BSS is detected. For example, certain coordination may be made between and among an AP and other respective devices within the communication system such that certain types of transmissions and communications may be prohibited, at least temporarily, if a transmission in an adjacent 1 MHz BSS is detected. From certain perspectives, operation in accordance with such an embodiment may be viewed as effectively making a first 1 MHz BSS defer to secondary channel-based 1 MHz transmissions as if the first 1 MHz BSS was a 2 MHz BSS in accordance with the deferential operation described above.

Figure 18:
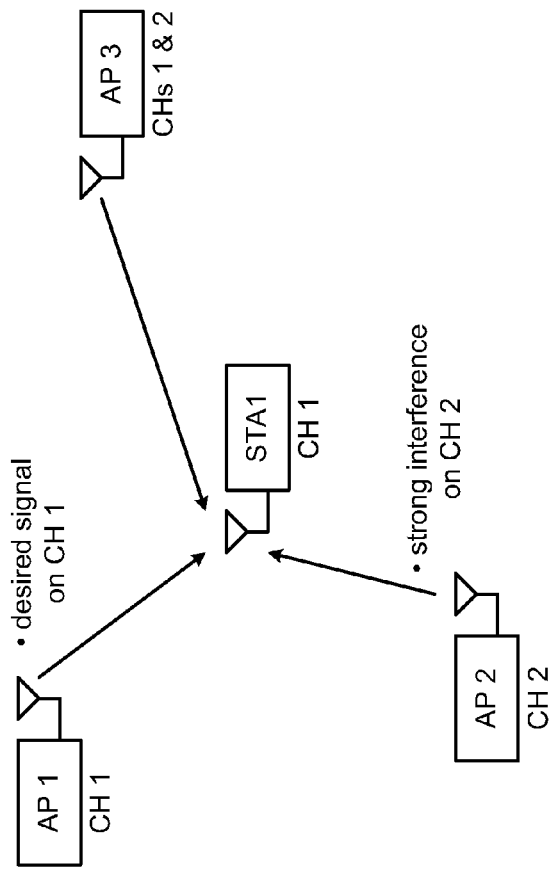

Referring to the embodiment 1800 of FIG. 18 (e.g., Option 2b), this respective implementation has some similarities with respect to the previous implementation, except that some filtering (e.g., analog and/or digital) may be allowed to reduce secondary 1 MHz interference (e.g., interference from channel 1 [0-1 MHz] to channel 2 [1-2 MHz] or from channel 2 [1-2 MHz] to channel 1 [0-1 MHz]) under certain circumstances. It is also noted that, for 1 MHz BSS, the adjacent 1 MHz channel residing in a 2 MHz channel is considered the secondary.

BUSY Secondary Channel Filtering

BUSY secondary channel is filtered for the duration indicated in the length field. Again, such filtering may be digital and/or analog (e.g., designer choice, implementation specific, etc.), but given the low 1 MHz bandwidth, it may be feasible to have an ADC with higher dynamic range to allow better rejection of strong 1 MHz channels digitally. Such filter use is optional and signaled to one of the communication devices (e.g., AP), and the lack of filtering increases risk of failure of concurrent primary transmission.

BUSY Secondary Channel: 1 MHz TX or RX

A 1 MHz operative communication device (e.g., STA) may transmit or receive when the secondary channel is BUSY. Such transmissions may be initiated during detected activity in the secondary channel and may begin within N msec of the start of the secondary reception (e.g., backoff is suspended beginning at N msec after start of secondary reception). Such usage of backoff may be employed to avoid failure to detect 2 MHz reception from transmitter that is hidden from secondary transmission source. Concurrent primary transmissions must complete before the end of the detected secondary activity because the secondary channel occupant will be less likely to detect activity in the primary channel using SIG field decode if STAs do not attempt to maintain a rough synchronization between activity in the two 1 MHz sub-channels.

Based on collected information regarding filter implementation at associated communication devices (e.g., STAs), plus any other information, one of the communication devices (e.g., an AP) can explicitly disallow 1 MHz primary transmission when secondary 1 MHz transmission is present.

If, during the STF/LTF/SIG fields of a secondary 1 MHz transmission, a 1 MHz transmission within the BSS occurs, it may be mis-detected (depending on power ratio and arrival time), such as over a relatively very small window.

Figure 19:
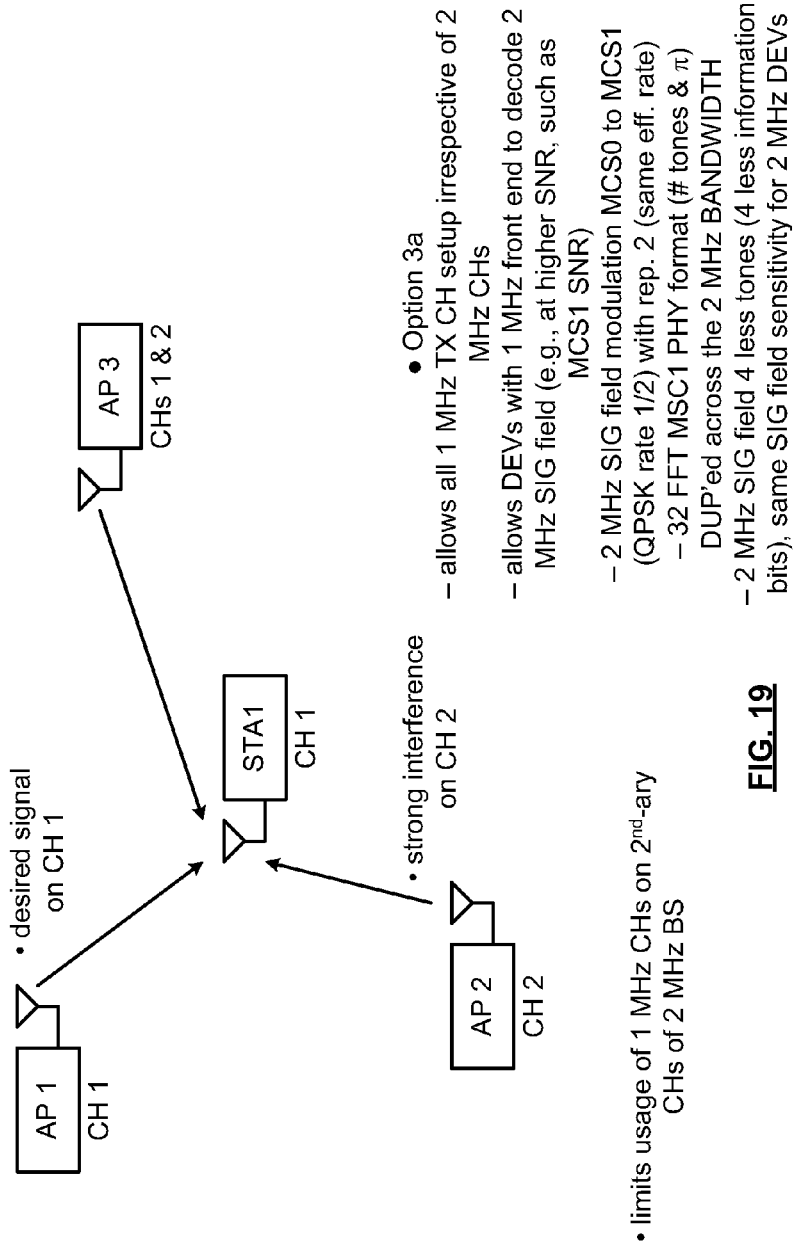

Referring to the embodiment 1900 of FIG. 19 (e.g., Option 3a), with respect to this particular embodiment, communications are allowed to be performed and set up on all respective 1 MHz channels irrespective of any 2 MHz channels. In addition this option further allows devices with a 1 MHz operable front end to perform decoding of a 2 MHz SIG field (e.g., however this may be performed at a relatively higher SNR). This may be achieved by changing certain characteristics associated with a given 2 MHz SIG field. For example, the 2 MHz SIG field modulation may be changed from MCS0 to MCS1 (e.g., such as operating in accordance with QPSK modulation having a rate of ½ with a repetition of 2, which can give the same effective rate).

In addition, duplication (e.g., DUP mode) of a 32 FFT MCS1 PHY format (e.g., having the same number of tones and interleaver) may be employed across the 2 MHz bandwidth. In accordance with such operation, a 2 MHz SIG field will now have 4 fewer respective tones and will lose 4 respective information bits but still maintain the same SIG field sensitivity for 2 MHz devices. As may be understood in accordance with current developing protocols, standards, and/or recommended practices, there may be and often are sufficiently many reserved bits in the 2 MHz SIG field in certain such developing protocols, standards, and/or recommended practices.

As such, those devices operative in accordance with 1 MHz operation can then decode the 2 MHz SIG field at an MCS1 SNR.

In certain embodiments, a 2 MHz SIG field tone plan may be implemented to accommodate the 2 MHz spectral mask or the 1 MHz spectral mask slightly better. For example, the following SIG field tone plan may be implemented to adhere to the 2 MHz spectral mask from the leftmost tone to the rightmost tone:

[−32 −31 −30 −29 guard, −28 ... −17 (11 data+1 pilot), −16 DC, −15 ... −2 (13 data+1 pilot), −1 0 1 DC, 2 ... 15(13 data +1 pilot), 16 DC, 17-28 (11 data +1 pilot), 29 30 31 guard]

It is also noted that other respective options may exist and be implemented such that the respective tones are shifted to the left and right (DC region expands to five tones) to allow for a better fit to the 1 MHz spectral mask. Alternatively, the 1 MHz DC tones at ±16 may be used and the 1 MHz receiver device may then use erasures while operating with a minimal, if any, performance degradation (e.g., such as operating in accordance with 1 erasure out of 24 tones).

It is further noted that early detection of a 2 MHz single-user (SU) open loop packet in comparison to a 2 MHz SU beamforming (BF) or multiuser (MU) packet may be effectuated using a 180° phase rotation of the SIG field symbol 2 relative to the symbol 1 therein. That is to say, in such an implementation, the different respective SIG field symbols may be rotated 180° with respect to one another. For example, it is noted that effectuating a 90° rotation may be less than optimal in certain situations (e.g., such as those operating in accordance with QPSK modulation).

In an even further alternative embodiment, packet classification as being either with respect to a 1 MHz packet or a 2 MHz packet may be implemented in accordance with using at least one implementation or variants of the LTF based classification approaches provided above and/or in accordance with using measurement of STF length. Generally speaking, it is noted that certain classification schemes and operations presented herein may be used independently and/or in combination with other respective classification schemes and operations.

Also, in certain other embodiments, early detection of a 2 MHz single user (SU) open loop packet vs. 2 MHz SU beamforming (BF) or multiuser (MU) packet is done via 180° phase rotation (e.g., equivalently multiplying by −1) of the lower (or upper) half of the second SIG symbol. In such embodiments, such a receiver communication device may be implemented to detect whether the received packet has one half (½) multiplied by −1 by finding the maximum of the following two metrics.

Metric 1: sum(abs(y+y1)^2); and
Metric 2: sum(abs(y−y1)^2); and
where y is the received signal in one half/the first half (½) and y1 is the received signal in the second half (½), ^2 denotes squaring and abs is the absolute of a complex number. The summation is done over the 24 tones that are used for each respective half.

Figure 20:
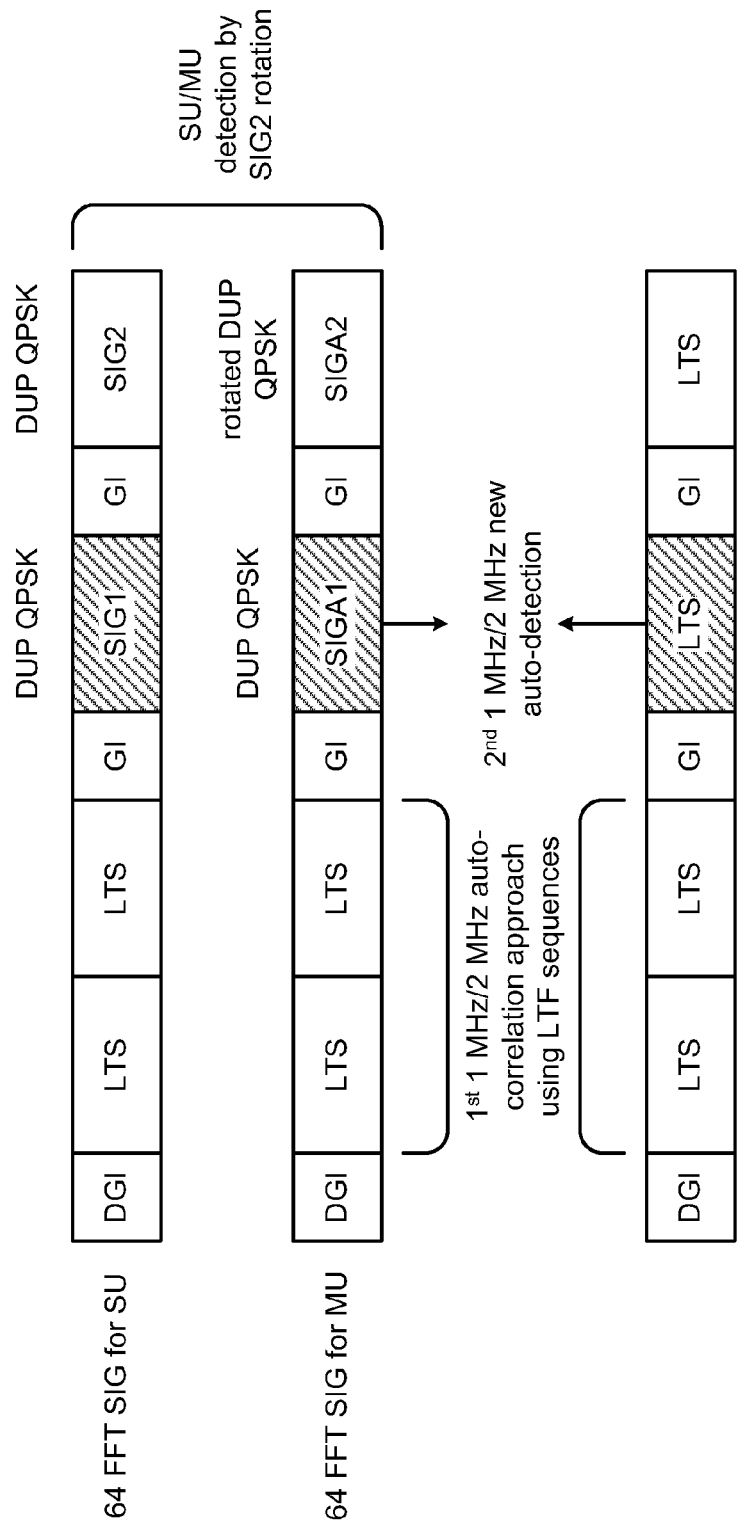
FIG. 20 illustrates an embodiment of different packet characteristics that may be used for classification between 1 MHz and 2 MHz types.

FIG. 20 illustrates an embodiment 2000 of different packet characteristics that may be used for classification between 1 MHz and 2 MHz types.

In accordance with performing classification between packets having types of 1 MHz vs. 2 MHz types, such classification may be implemented using the novel LTF based method as described above (e.g., Option A) or the following novel approach.

This new classification approach takes advantage of the fact that the receiver communication device either sees a 1 MHz third LTF or a 2 MHz SIG field using random QPSK modulation. The receiver communication device can use any number of metrics that exploit that fact.

For example, the receiver communication device may multiply the received average signal from LTS symbols 1 and 2 with the received signal in the appropriate portion of the LTS (e.g., SIG1, SIGA1, LTS shown by the hashed line portion) and sums up across all 26 tones. If the received packet is 1 MHz, the tones will add up coherently to a large positive number. If the received packet is 2 MHz, the tones will be random due to the random QPSK signaling and will not sum up to a large number.

Alternatively, the receiver communication device may divide the received signal in the appropriate portion of the LTS (e.g., SIG1, SIGA1, LTS shown by the hashed line portion) by the received average signal from LTS symbols 1 and 2. If the packet received is 1 MHz, the outcome is the value 1 (plus noise) otherwise a random QPSK constellation. After summing up coherently across each 26 tones in every half the signal, the result will either be high or a small random number.

For either of these two respective options above, the receiver communication device may be implemented to use a threshold to decide whether a 1 MHz or 2 MHz packet was received. The threshold may be determined (e.g., off-line or in real time adaptively, etc.) based on the required false triggering for 2 MHz and 1 MHz packets.

Figure 21:
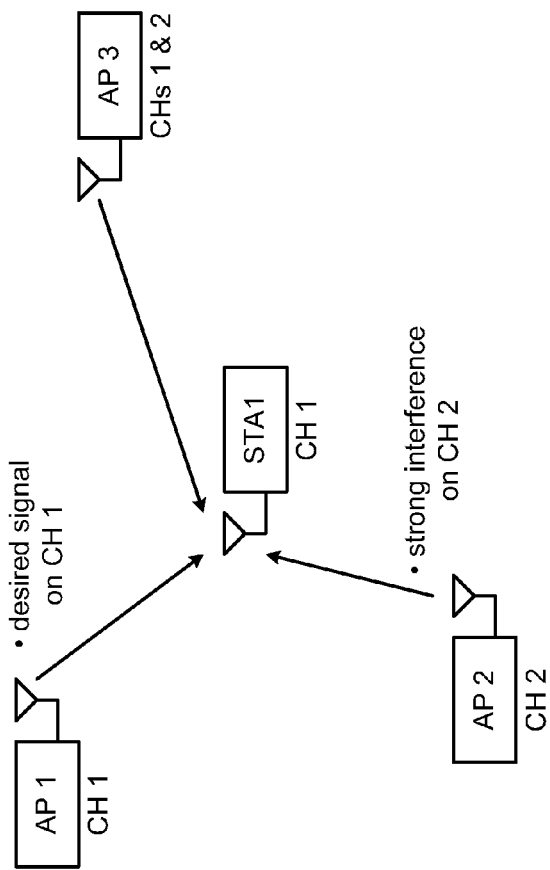
FIG. 21 and FIG. 22 illustrate various respective embodiments of different respective communication devices operating in a communication system or network in accordance with various practices, implementations, and/or rules.
Figure 22:
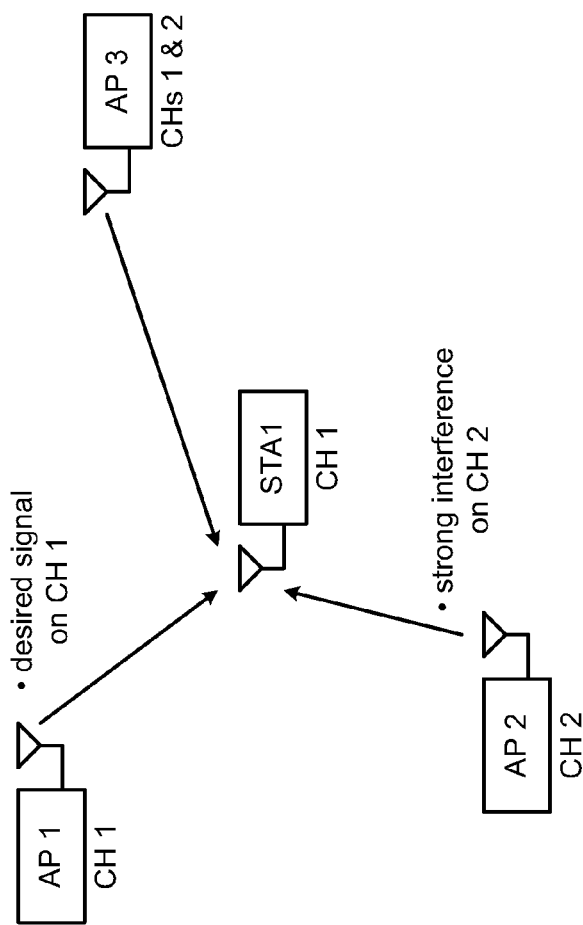

FIG. 21 and FIG. 22 illustrate various respective embodiments of different respective communication devices operating in a communication system or network in accordance with various practices, implementations, and/or rules.

Referring to the embodiment 2100 of FIG. 21 (e.g., Option 3b), this respective implementation has some similarities with respect to the previous implementation, except that a relatively lower (e.g., relatively lower than MCS1) MCS may be used in the SIG field is therefore and consequently extended to 3 symbols. For example, in accordance with one particular embodiment, an MCS corresponding to BPSK modulation and having a rate of ⅔ or having a rate of ¾ may be used in each of the respective duplicated halves (e.g., in a DUP mode thereby providing for an effective rate associated with BPSK rate ⅓ or ⅜.

For example, the following respective MCSs may be employed:
  Rate ⅔: employing 24 data tones×3 symbols×⅔ information bits/tones=48 information bits
  Rate ¾: employing 22 data tones×3 symbols×¾ information bits/tones=49 information bits (and which should provide relatively slightly better tone mapping that avoids 3 tones around DC: −26: −3 and 3:26)

In an alternative embodiment, the Rate ¾ may be implemented as follows:
  Rate ¾: employing 22 data tones×3 symbols×¾ information bits/tones=49 information bits (and which should provide relatively slightly better tone mapping as follows:

[−32 −31 −30 −29 guard, −28 . . . −17 (11 data+1 pilot), −16 DC, −15 . . . −3 (11 data+1 pilot), −3 −2 −1 0 1 2 3 DC, 4 . . . 15(11 data+1 pilot), 16 DC, 17-28 (11 data+1 pilot), 29 30 31 guard])

It is noted that these relatively new MCSs may provide for relatively better performance than MCS0 while also improving the sensitivity of SIG field detection for 2 MHz devices. Also, rotations of respective portions of the SIG field may remain unchanged in this particular embodiment.

It is noted further that both of the respective Options 3a and 3b described elsewhere herein allow a 1 MHz operative device within a 1 MHz BSS to use a front-end 1 MHz filter to avoid triggering with respect to communications on adjacent 1 MHz channels (e.g., which may be accompanied with the expense of between 3 to 3.5 dB loss in 2 MHz SIG field sensitivity). However, it is noted that no 1 MHz front end is necessarily needed in all respective cases. For example, in many cases where there either is no adjacent 1 MHz channel or in which cases there is a relatively low probability or low occurrence of traffic existing within adjacent 1 MHz channels, there may not specifically be a need for a 1 MHz front end in all such devices. However, in other embodiments, it may be desirable that all or a majority of the respective devices operative within the system include both a 1 MHz front end and a 2 MHz front end. In certain embodiments, a further consideration may be provided such that any 1 MHz operative device may employ a 1 MHz filter (e.g., such as a bandpass filter) at any time that that AP allows it (e.g., such as in accordance with a one bit signaling in the beacon).

Within certain embodiments, certain consideration may be made with respect to peak to average power ratio (PAPR). For example, due to operation in accordance with the duplication (DUP) mode, the PAPR may sometimes undesirably increased by approximately 2 dB. A similar situation may exist or occur in the 1 MHz MCS0 rep2 mode as well.

In one possible embodiment, such repetition may be broken by multiplying 12 SIG field data tones within a particular quarter of the 2 MHz waveform by −1 (e.g., These 12 respective SIG field data tones of the entire 48 SIG field data tones may be located within any particular quarter portion of the SIG field, such as on the left-hand side most quarter, the right-hand side most quarter, or any other quarter portion of the SIG field). Such operation will generally have the effect of changing the polarity of those respective 12 SIG field data tones. If desired, a similar operation may be employed to change the polarity of certain respective SIG field data tones for the 1 MHz MCS0 rep2 mode as well.

Alternatively, other respective pseudo-noise (PN) sequences can be used to break the repetition of respective tones. For example, an alternating 1, −1, 1, −1, etc. sequence may be applied to one of the duplicated halves of the entire SIG field data tones or a more general phase rotation (e.g. $e^{(j \times 2 \times \pi \times (k/M))}$), where k is a tone number and M is a chosen number indicating the periodicity of the phase rotation.

Referring to the embodiment 2200 of FIG. 22 (e.g., Option 4), this option also allows for all respective 1 MHz channels to be set up in operative irrespective of any 2 MHz channels. With respect to the previous options, this option further operates by adding a new 2 MHz preamble consisting of a duplication (e.g., DUP) mode of the relatively more robust 1 MHz preamble. If desired, the normal 2 MHz SIG field can still use the structure provided with respect to the previous Options 3a/3b.

In accordance with such operation, and AP operative in accordance with a 2 MHz BSS may be implemented to decide, based on the presence of a secondary and/or primary 1 MHz BSS, the respective amount of certain operational parameters by which he respective devices within the communication system should operate. For example, certain operational parameters may relate to the amount or number of retransmissions and/or other factors to be used based upon whether or not this relatively long preamble format should be used in all of the respective transmissions in the given BSS. In accordance with such cooperation between the AP and the respective devices within the system, a one bit indication in the beacons may be used for signaling.

In addition, it is noted that respective 1 MHz and 2 MHz operative devices should include functionality and capability to distinguish the different types of preambles. For example, such devices should be implemented incapable to know that, although such a preamble may appear to be a 1 MHz preamble, it is actually corresponding to a 2 MHz transmission. Such further distinction may be effectuated by adding one bit to the 1 MHz duplicated (DUPed) SIG field to signal whether or not the preamble corresponds to the 1 MHz bandwidth or to the 2 MHz bandwidth.

Option 5

With regards to providing a preamble structure operative in accordance with communication systems including devices of varying capability (e.g., such as those operating in accordance with 1 MHz, 2 MHz, or even higher frequencies), another option is presented herein that enables coexistence between varying capability devices (e.g., those operating using 1 MHz and 2 MHz transmission) by adding a new coexistence symbol carrying a new signal field ($SIG_{new}$) (e.g., note: this is not the normal signal field (SIG)) at the end of the 2 MHz signal field (e.g., $SIG_{2\ Mhz}$) which utilizes a duplication mode structure having some similarities to that described above with reference to Option 3a. For example, while a new coexistence symbol is proposed, it may be implemented in accordance with a duplication mode structure (e.g., DUP).

Such a new coexistence symbol may be added after a mid-amble, as described above with respect to other various embodiments (e.g., Such as with respect to an embodiment described above including a mid-amble having one STF and one or more LTFs added after every certain number of data symbols, such as after every N DATA symbols).

While this new proposed structure has some similarities to that described above with reference to Option 3a, there are certain differences. For example, the 2 MHz signal field (e.g., $SIG_{2\ Mhz}$) design remains unchanged from that which is presented above, and those communication devices (e.g., STA's, transceivers, or receivers) operative in accordance with 2 MHz may be configured in operative to skip processing of this newly proposed coexistence symbol. In accordance with such operation, the mapping of data (e.g., DATA) may be allowed to be optimized more particularly for those devices (e.g., STA's, transceivers, or receivers) operative in accordance with 1 MHz.

Also, devices (e.g., STA's, transceivers, or receivers) operative in accordance with 1 MHz will nonetheless receive the minimum amount of information required for deferring access to the communication medium for the duration of the 2 MHz packet. That is to say, such devices (e.g., STA's, transceivers, or receivers) operative in accordance with 1 MHz will still receive the appropriate amount and necessary information to know the duration during which there will be occupancy of the communication medium. In response to such information, such devices (e.g., STA's, transceivers, or receivers) operative in accordance with 1 MHz may perform any of a number of operations (e.g., enter into sleep mode, enter into a reduced functionality and/or power mode, remain idle, etc.). In a preferred and body meant of this newly proposed coexistence symbol, a one symbol duplicated (DUP'ed) SIG may be implemented to carry up to 24 bits of information.

Option 5: Tone Position

With respect to the location of such tones, it is noted that such tones associated with this newly proposed coexistence symbol are implemented within tones that will be seen and/or processed by devices (e.g., STA's, transceivers, or receivers) operative in accordance with 1 MHz. For example, for proper decoding of such a newly proposed coexistence symbol, it is desirable that all such communication devices, regardless of the operational mode in which they operate, will be able to see and/or process this newly proposed coexistence symbol.

Considering the notation of it 2 MHz frame format (tone −32 to +31), the 1 MHz frame format uses, on the left side, tones −29 to −3 or, on the right side, tones +3 to +29 (e.g., excluding the DC tones −16 and +16). However, it is noted that for 2 MHz or higher bandwidth packets, only those tones located between either −28:+28 or −26: +26 are employed. As such, a number of different possible implementations are provided herein by which the newly proposed coexistence symbol may be implemented. With respect to certain embodiments presented below, while tone mapping is referenced with respect to the right side only, in accordance with the symmetry of tone mapping, it is noted that there are also corresponding tones that are implemented with respect to the left side. For example, while tones A through B may be referred to in certain implementations provided below, it is of course noted that tones −A through −B would also be implemented in such symmetrical embodiments.

In accordance with a first possible embodiment in accordance with tone mapping, the data portion of a packet (e.g., DATA) may be mapped to tones +3 to +27 (excluding DC) (e.g., again, such data would correspondingly also be mapped to tones −3 to −27). In accordance with this first possible embodiment, no pilot tones would be sent. Because no pilot tones are sent, 24 tones would feel available for the transmission of the data portion of a packet (e.g., DATA). It is noted that those devices (e.g., STA's, transceivers, or receivers) operative in accordance with 1 MHz would not necessarily need any pilot tones since the receipt of such a newly proposed coexistence symbol would be a later arriving or last received symbol for such devices. In addition, those devices (e.g., STA's, transceivers, or receivers) operative in accordance with 2 MHz could skip the newly proposed coexistence symbol entirely or re-encode the information (e.g., that information known to such a device based on the 2 MHz signal field (e.g., $SIG_{2\ Mhz}$)). As such, devices (e.g., STA's, transceivers, or receivers) operative in accordance with 2 MHz may be implemented to use an entire symbol worth of pilot tones.

In accordance with a second possible embodiment in accordance with tone mapping, those tones which are currently occupied and/or used in accordance with a prior 1 MHz tone mapping frame format could be used. For example, in such an embodiment, all of the tones from +3 to +29 could be utilized (e.g., again, such tone mapping would correspondingly also include the tones −3 to −29).

In accordance with a first possible variant of such a second possible embodiment in accordance with tone mapping, pilot tones could be sent based on a 1 MHz tone design (e.g., including those tones at locations +9, +23 as well as those tone locations −9, −23). Such implementation may provide for efficiency in accordance with decoding in accordance with a 1 MHz operational mode, and the respective pilot tones may also be used by a device (e.g., STA, transceiver, or receiver) operative in accordance with 2 MHz for other uses (e.g., frequency tracking).

In accordance with a second possible variant of such a second possible embodiment in accordance with tone mapping, pilot tones could be sent based on a 2 MHz tone design (e.g., including those tones at locations +7, +21 as well as those tone locations −7, −21). In accordance with such a variant, frequency offset tracking may be improved and/or simplified for devices (e.g., STA's, transceivers, or receivers) operative in accordance with 2 MHz. However, it is noted that such an implementation in incur expense of a slightly different tone plan for devices (e.g., STA's, transceivers, or receivers) operative in accordance with 1 MHz in this symbol.

In accordance with a third possible variant of such a second possible embodiment in accordance with tone mapping, tone mapping may be implemented such that all respective devices are provided their respective pilot tones. However, as may be understood, by providing all respective pilot tones, there may be some DATA throughput loss because certain DATA may be punctured and/or erased and replaced with pilot tones. For example, in accordance with such a variant, pilot tones may be sent on the four respective pilot locations as included within each of the respective 1 MHz and 2 MHz tone mappings (e.g., including those tones at locations +9, +23 as well as those tone locations −9, −23 for devices (e.g., STA's, transceivers, or receivers) operative in accordance with 1 MHz; and including those tones at locations +7, +21 as well as those tone locations −7, −21 for devices (e.g., STA's, transceivers, or receivers) operative in accordance with 2 MHz). Such an implementation would provide for frequency tracking by a device (e.g., STA, transceiver, or receiver) operative in accordance with 2 MHz. In addition, such an implementation would not require any change in the decoding to be performed by a device (e.g., STA, transceiver, or receiver) operative in accordance with 1 MHz at a higher decoding loss, sends another device (e.g., AP or transmitter) may be implemented to puncture and/or erased DATA mapped to the 2 MHz pilot locations within the 2 MHz pilot tones.

In accordance with a third possible embodiment in accordance with tone mapping, after mapping the 2 MHz pilot locations within the 2 MHz pilot tones (e.g., or even higher bandwidth), the other device (e.g., AP or transmitter) maybe operative to replace any information that may be existence on certain tones (e.g., those tones 27:29, again, in accordance with symmetry, could include those tones −27:−29) by replacing them with the value zero. That is to say, any information that may be resident on certain tones may be erased and forced to a value of 0. After erasing any information existent on such tones, the power associated with those remaining tones may be readjusted (e.g., such as to ensure that the average power on the remaining tones is at a desired or particular value, such as 1). Such readjustment of power after erasing any information that may be resident on these certain tones may provide for improved performance of a device (e.g., STA, transceiver, or receiver) operative in accordance with 1 MHz which may be implemented to consider or look at only a specific other number of tones (e.g., those tones 3:26, again, in accordance with symmetry, could include those tones −3: −26) in order to optimize the received power on those respective tones. As such, instead of transmitting 26 tones including both DATA and Pilots, transmission of only 23 respective tones may be made thereby boosting the power by a certain amount (e.g., $10 \times \log_{10}(26/23)$ dB or approximately 0.5 dB). Also, it is noted that if pilots are not transmitted on all respective tones, only tone 27 (with symmetry, and −27) would need to be erased in accordance with providing a power boost by Aidan other certain amount (e.g., $10 \times \log_{10}(24/23)$ dB or approximately 0.2 dB).

Option 5: Content

With respect to the content of such a newly proposed coexistence symbol, certain embodiments may include up to 14 bits signaling a hybrid duration value. Such a hybrid duration value may correspond to the sum of a MAC duration plus the current PLCP Protocol Data Unit (PPDU) remaining length in any desired resolution (e.g., 4 µs, 8 µs, or 10 µs). By providing such a hybrid duration value, a device (e.g., STA, transceiver, or receiver) operative in accordance with 1 MHz will be provided state information corresponding to the communication medium from a 2 MHz PPDU which it would not otherwise be able to process and understand appropriately. In addition, this may also allow for a more fair sharing of the communication medium and spectrum for devices (e.g., STA's, transceivers, or receivers) operative in accordance with 1 MHz as well as those devices (e.g., STA's, transceivers, or receivers) operative in accordance with 2 MHz. The MAC duration may be viewed as corresponding to the amount of time required to transmitted in expected sequence of PPDU's that follow this particular or current PPDU and the interframe spaces that separate those PPDU's. For example, the total time for the following interframe spaces and PPDU's would be indicated thereby: SIFS+ACK+SIFS+DATA+SIFS+ACK. A current PPDU may be viewed as being that particular PPDU which contains this newly proposed coexistence symbol which itself contains the hybrid duration value therein. The remaining length of the PPDU corresponds to the length of the symbols in the current PPDU that follow the newly proposed coexistence symbol.

In a preferred embodiment, such a newly proposed coexistence symbol may also going implemented to include 4 CRC bits and 6 tail bits.

In an alternative embodiment, such MAC duration related information may be placed inside of the normal signal field (SIG) for a given framework packet. For example, such MAC duration related information may be included within the regular SIG field for any desired bandwidth (e.g., 1 MHz, 2 MHz, 4 MHz, 8 MHz, 16 MHz, and/or any other desired bandwidth). Such MAC duration related information may be included therein as in addition to the existing length information in that respective SIG field to create a dual-duration PHY SIG field.

For example, considering a 2 MHz format PPDU, more than one respective length/duration field may be implemented within a SIG field symbol. For example, one length field therein may be implemented to correspond to the existing PPDU length field, which describes the length of the current PPDU. Another length field therein may be implemented to correspond to MAC duration related information. A given device (e.g., STA, transceiver, or receiver) may be implemented and operative to combine the information from both of these respective length fields to obtain appropriate incomplete information corresponding to the duration during which the communication medium will be occupied. After having such information regarding the duration of occupancy of the communication medium, such a device may perform any of a number of operations (e.g., enter into sleep mode, enter into a reduced functionality and/or power mode, remain idle, etc.). Also, such a device (e.g., STA, transceiver, or receiver) may be configured or implemented separately to determine the exact length of the current PPDU if desired. For example, if a given device (e.g., STA, transceiver, or receiver) in fact need such information, then that respective device can separately determine the exact length of the current PPDU.

Moreover, in accordance with operation compliant with an existing frame format (e.g., such as those operative in accordance with IEEE 802.11ac, IEEE 802.11ah, etc.), the partial association identifier (AID) bits may be replaced by such MAC duration related information thereby providing such a duel-duration format.

It is also noted that within any described embodiment, diagram, etc. herein, reference may be made with respect to operation in accordance with two or more specific examples of operational modes (e.g., 1 MHz operational mode and 2 MHz operational mode, or equivalent). Generally speaking, any such embodiment, diagram, etc. that is described specifically with respect to any two or more specific operational modes may generally be understood as also including and being equivalent to operation in accordance with any two or more general operational modes. That is to say, while different respective operational modes may be described with respect to one or more specific parameters (e.g., with respect to a bandwidth parameter in comparing 1 MHz operational mode and 2 MHz operational mode), it is generally noted that such adaptation and operation may generally be described with respect to a first operational mode, a second operational mode, etc. (e.g., or even more operational modes).

FIG. 23, FIG. 24, and FIG. 25 are diagrams illustrating embodiments of methods for operating one or more wireless communication devices.

Referring to method 2300 of FIG. 23, via at least one antenna of a communication device, Referring to method 2300 of FIG. 23, the method 2300 begins by transmitting at least one first signal or receiving at least one second signal from at least one additional communication device, as shown in a block 2310.

The method 2300 continues by operating a physical layer (PHY) the communication device to support communications with the at least one additional communication device in accordance with a plurality of channel bandwidths, such that a first of the plurality of channel bandwidths is a sub-channel of a second of the plurality of channel bandwidths, as shown in a block 2320.

The method 2300 then operates by analyzing the at least one second signal, or at least one additional signal corresponding to the at least one second signal, to identify any communication activity on any one of the plurality of channel bandwidths, as shown in a block 2330. For example, it may be noted that a signal received from a communication channel may be of a first type (e.g., such as a continuous time signal), while one or more additional signals may be generated from that signal having the first type (e.g., such as in accordance with generating a digital signal, a baseband signal, etc.).

The method 2300 continues by selectively not transmitting any signal for a period of time when communication activity is identified on any one of the plurality of channel bandwidths or allowing communications with the at least one additional communication device window communication activity is identified on any one of the plurality of channel bandwidths, as shown in a block 2340.

As may be understood with respect to one preferred embodiment operating using channel bandwidths of 1 MHz or 2 MHz (e.g., such that a 1 MHz channel may be a sub-channel of a 2 MHz channel, and such that a given 2 MHz channel may have to respective and adjacent sub-channels therein), monitoring of communication activity on any one of the 1 MHz sub-channels may be used to determine that no other communications are to be effectuated by at least one of the communication devices effectuating the method 2300.

Referring to method 2400 of FIG. 24, the method 2400 begins by decoding a signal to extract at least one of preamble and signal field (SIG) information therein, as shown in a block 2410. Based on the at least one of preamble and SIG information, the method 2400 continues by selectively decoding are not decoding a remainder of the signal following the at least one of preamble and SIG information, as shown in a block 2420.

For example, in certain embodiments, every respective communication device within a given communication system may be implemented and operative to perform decoding of preamble and SIG field information for any reception within a 2 MHz channel. However, a remainder of a given signal (e.g., PHY payload for secondary receptions) need not necessarily be decoded in all instances. For example, based upon information determined from decoding one or both of the preamble and SIG, a remainder of the signal may only selectively be decoded.

Referring to method 2500 of FIG. 25, the method 2500 begins by operating a physical layer (PHY) a communication device to support communications with the at least one additional communication device in accordance with a plurality of channel bandwidths, such that a first of the plurality of channel bandwidths is a sub-channel of a second of the plurality of channel bandwidths, as shown in a block 2510.

The method 2500 continues by operating the PHY to monitor continuously a largest of the plurality of channel bandwidths for communication activity thereon, as shown in a block 2520. For example, considering an embodiment operating using channel bandwidths of 1 MHz and 2 MHz, the PHY may be operated to monitor continuously the 2 MHz channel bandwidth to listen for any such communication activity thereon, even though that particular communication device may belong to a 1 MHz basic services set (BSS).

The method 2500 then operates by operating the PHY to support transmission communications only via channel bandwidth of a common size as the first of the plurality of channel bandwidths that is the sub-channel of the second of the plurality of channel bandwidths, as shown in a block 2530. For example, a given communication device may belong to a 1 MHz BSS, and as such, the PHY of that communication device may be operative to support transmission communications only via 1 MHz channel bandwidths. However, that same communication device which belongs to a 1 MHz BSS may nonetheless be operative to monitor for communication activity on a 2 MHz channel bandwidth. Communication activity on the 2 MHz channel bandwidth, or any such 1 MHz channel bandwidths may be used to prohibit any such communications by the communication device on a 1 MHz channel bandwidth.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein including one of more baseband processing modules, one or more media access control (MAC) layers, one or more physical layers (PHYs), and/or other components, etc. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

Mode Selection Tables:

TABLE 1

| 2.4 GHz, 20/22 MHz channel BW, 54 Mbps max bit rate | | | | | | | | | |
|---|---|---|---|---|---|---|---|---|---|
| Rate | Modulation | Code Rate | NBPSC | NCBPS | NDBPS | EVM | Sensitivity | ACR | AACR |
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |

TABLE 7-continued

Channelization for Table 6

| Channel | Frequency (MHz) |
|---|---|
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. An apparatus comprising:
a physical layer (PHY) processor configured to:
support communications with the at least one additional apparatus in accordance with a plurality of channel bandwidths, such that a first of the plurality of channel bandwidths is a sub-channel of a second of the plurality of channel bandwidths;
continuously to monitor one of the plurality of channel bandwidths for communication activity thereon; and
a baseband processor configured to:
analyze at least one signal received from the at least one additional apparatus, or at least one additional signal corresponding to the at least one signal, to identify any communication activity on any one of the plurality of channel bandwidths;
selectively direct the apparatus not to transmit any signal for a period of time when communication activity identified on any one of the plurality of channel bandwidths or allow the apparatus to support the communications with the at least one additional apparatus when no communication activity identified on any one of the plurality of channel bandwidths; and
decode the at least one signal, or the at least one additional signal corresponding to the at least one signal, to extract at least one of preamble and signal field (SIG) information therein; and
based on the at least one of preamble and SIG information, selectively decode or not decode a remainder of the at least one signal, or the at least one additional signal corresponding to the at least one signal, following the at least one of preamble and SIG information.

2. The apparatus of claim 1, wherein:
the one of the plurality of channel bandwidths is 2 MHz;
the second of the plurality of channel bandwidths is a 2 MHz bandwidth channel; and
the first of the plurality of channel bandwidths is a 1 MHz sub-channel of the 2 MHz bandwidth channel.

3. The apparatus of claim 1, wherein the baseband processing processor is further configured to:
extract signal field (SIG) length information from the at least one signal or the at least one additional signal corresponding to the at least one signal; and
selectively direct the apparatus not to transmit any signal for a counted down period of time based on the SIG length information.

4. The apparatus of claim 1 further comprising:
a laptop computer, a personal digital assistant, a personal computer, or a cellular telephone.

5. The apparatus of claim 1 further comprising:
a wireless station (STA), wherein the at least one additional apparatus is an access point (AP).

6. An apparatus comprising:
a physical layer (PHY) processor configured to support communications with at least one additional apparatus using a plurality of channel bandwidths, wherein a first of the plurality of channel bandwidths is a sub-channel of a second of the plurality of channel bandwidths; and
a baseband processor configured to:
analyze at least one signal received from the at least one additional apparatus, or at least one additional signal corresponding to the at least one signal, to identify any communication activity on any one of the plurality of channel bandwidths; and
selectively direct the apparatus not to transmit any signal for a period of time when communication activity is identified on any one of the plurality of channel bandwidths or allow the apparatus to support the communications with the at least one additional apparatus when no communication activity is identified on any one of the plurality of channel
decode the at least one signal, or the at least one additional signal corresponding to the at least one signal, to extract at least one of preamble and signal field (SIG) information therein; and
based on the at least one of preamble and SIG information, selectively decode or not decode a remainder of the at least one signal, or the at least one additional signal corresponding to the at least one signal, following the at least one of preamble and SIG information.

7. The apparatus of claim 6, wherein:
a largest channel bandwidth of any of the plurality of channel bandwidths is 2 MHz;
the second of the plurality of channel bandwidths is a 2 MHz bandwidth channel; and
the first of the plurality of channel bandwidths is a 1 MHz sub-channel of the 2 MHz bandwidth channel.

8. The apparatus of claim 6, wherein:
the PHY continuously to monitor one of the plurality of channel bandwidths for communication activity thereon.

9. The apparatus of claim 6, wherein the baseband processing processor is further configured to:
extract signal field (SIG) length information from the at least one signal or the at least one additional signal corresponding to the at least one signal; and
selectively direct the apparatus not to transmit any signal for a counted down period of time based on the SIG length information.

10. The apparatus of claim 6 further comprising:
a laptop computer, a personal digital assistant, a personal computer, or a cellular telephone.

11. The apparatus of claim 6, wherein the PHY processor is further configured to:
perform signal detection of the at least one signal received from the at least one additional apparatus based on a first portion of a signal field (SIG) field within the at least one signal having a phase rotation relative to a second portion of a SIG field within the at least one signal.

12. The apparatus of claim 6 further comprising:
a communication device within a 2 MHz basic services set (BSS) self-imposing 1 MHz communications on at least one of a first 1 MHz bandwidth channel and a 2 MHz bandwidth channel adjacent thereto within a 2 MHz channel bandwidth.

13. The apparatus of claim 6 further comprising:
a wireless station (STA), wherein the at least one additional apparatus is an access point (AP).

14. A method for execution by a communication device, the method comprising:
operating a physical layer (PHY) of the communication device to support communications with at least one additional communication device in accordance with a plurality of channel bandwidths, such that a first of the plurality of channel bandwidths is a sub-channel of a second of the plurality of channel bandwidths;
analyzing at least one signal received from the at least one additional communication device, or at least one additional signal corresponding to the at least one signal, to identify any communication activity on any one of the plurality of channel bandwidths;
selectively not transmitting any signal for a period of time when communication activity identified on any one of the plurality of channel bandwidths or allowing communications with the at least one additional communication device when no communication activity identified on any one of the plurality of channel bandwidths;

decoding the at least one signal, or the at least one additional signal corresponding to the at least one signal, to extract at least one of preamble and signal field (SIG) information therein; and based on the at least one of preamble and SIG information, selectively decoding or not decoding a remainder of the at least one signal, or the at least one additional signal corresponding to the at least one signal, following the at least one of preamble and SIG information.

15. The method of claim 14, wherein:
a largest channel bandwidth of any of the plurality of channel bandwidths is 2 MHz;
the second of the plurality of channel bandwidths is a 2 MHz bandwidth channel; and
the first of the plurality of channel bandwidths is a 1 MHz sub-channel of the 2 MHz bandwidth channel.

16. The method of claim 14 further comprising:
operating the PHY to monitor continuously one of the plurality of channel bandwidths for communication activity thereon.

17. The method of claim 14 further comprising:
extracting signal field (SIG) length information from the at least one signal or the at least one additional signal corresponding to the at least one signal; and
selectively not transmitting any signal for a counted down period of time based on the SIG length information.

18. The method of claim 14, wherein the communication device is a laptop computer, a personal digital assistant, a personal computer, or a cellular telephone.

19. The method of claim 14 further comprising:
performing signal detection of the at least one signal received from the at least one additional communication device based on a first portion of a signal field (SIG) field within the at least one signal having a phase rotation relative to a second portion of a SIG field within the at least one signal.

20. The method of claim 14, wherein the communication device is an access point (AP), and the at least one additional communication device is a wireless station (STA).

* * * * *

UNITED STATES PATENT AND TRADEMARK OFFICE
CERTIFICATE OF CORRECTION

PATENT NO.      : 8,774,124 B2                           Page 1 of 1
APPLICATION NO. : 13/454033
DATED           : July 8, 2014
INVENTOR(S)     : Porat et al.

It is certified that error appears in the above-identified patent and that said Letters Patent is hereby corrected as shown below:

In the claims,

Col. 39, line 64, in claim 6: delete "and" after "bandwidths;"
Col. 40, line 4, in claim 6: replace "one of the plurality of channel" with --one of the plurality of channels;--
Col. 40, lines 25-26, in claim 9: replace "the baseband processing processor" with --the baseband processor--
Col. 40, line 40, in claim 11: replace "signal field (SIG) field" with --signal field (SIG)--
Col. 42, line 14, in claim 19: replace "signal field (SIG) field" with --signal field (SIG)--

Signed and Sealed this
Sixth Day of October, 2015

Michelle K. Lee
*Director of the United States Patent and Trademark Office*